United States Patent
Plemons et al.

(10) Patent No.: US 11,970,270 B2
(45) Date of Patent: Apr. 30, 2024

(54) CHAFF DISPENSING SYSTEMS AND METHODS OF OPERATION

(71) Applicant: BAE Systems Information and Electronic Systems Integration Inc., Nashua, NH (US)

(72) Inventors: Danny L. Plemons, Austin, TX (US); Mark J. Dube, McDade, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 88 days.

(21) Appl. No.: 17/205,757

(22) Filed: Mar. 18, 2021

(65) Prior Publication Data

US 2022/0297836 A1     Sep. 22, 2022

(51) Int. Cl.
*B64D 1/02*     (2006.01)

(52) U.S. Cl.
CPC ...................................... *B64D 1/02* (2013.01)

(58) Field of Classification Search
CPC . F42B 12/48; F42B 12/70; F42B 1/15; B64D 1/12; B65D 35/28; B65D 35/285; B65G 33/00; B65G 33/14
See application file for complete search history.

(56) References Cited

U.S. PATENT DOCUMENTS

| | | | | |
|---|---|---|---|---|
| 3,808,595 A | * | 4/1974 | Coop | F42B 12/70 102/505 |
| 4,167,008 A | | 9/1979 | Blickenstaff | |
| 5,445,078 A | * | 8/1995 | Marion | F42B 12/70 248/225.11 |

(Continued)

FOREIGN PATENT DOCUMENTS

| | | | |
|---|---|---|---|
| CN | 107381060 A | * | 11/2017 |
| DE | 9417841 U1 | * | 11/1994 |

(Continued)

OTHER PUBLICATIONS

International Search Report, PCT/US22/20545, dated Jun. 14, 2022, 11 pages.

*Primary Examiner* — Joshua J Michener
*Assistant Examiner* — Ryan Andrew Yankey
(74) *Attorney, Agent, or Firm* — Sand, Sebolt & Wernow LPA; Gary McFaline

(57) ABSTRACT

The present disclosure relates to a chaff dispensing system that is provided on an aircraft. The chaff dispensing system includes a container, a dispensing assembly, a controller, and a volume of chaff material. The container has a first end, a second end, and a chamber that extends between the first and second ends, and the second end defines an ejection port. The dispensing assembly is provided on the aircraft, and the dispensing assembly is operably engaged to the container. The controller is electrically connected to the dispensing assembly. The volume of chaff material is disposed inside the chamber of the container. The volume of chaff material is dispensed by the dispensing assembly operably through the controller in metered volumes of chaff material. In addition, a first volume of chaff material may be metered at a first time and a second volume chaff material may be metered at a second time in which the second volume of chaff material is different than the first volume of chaff material.

5 Claims, 11 Drawing Sheets

(56) References Cited

U.S. PATENT DOCUMENTS

| | | | | |
|---|---|---|---|---|
| 5,663,518 A | * | 9/1997 | Widmer | F41H 11/02 83/346 |
| 5,773,745 A | * | 6/1998 | Widmer | F41H 11/02 83/346 |
| 5,875,929 A | * | 3/1999 | Nguyen | B65D 35/285 222/102 |
| 6,250,506 B1 | * | 6/2001 | Geiger | A47J 31/404 222/413 |
| 6,485,263 B1 | * | 11/2002 | Bryant | F04B 43/0081 92/96 |
| 6,666,351 B1 | * | 12/2003 | Hartz | F41H 11/02 102/342 |
| 7,610,841 B2 | * | 11/2009 | Padan | B64D 37/12 89/1.8 |
| 7,866,246 B2 | | 1/2011 | Bellino et al. | |
| 2016/0017880 A1 | * | 1/2016 | Maguire | F04B 43/1284 417/410.3 |

FOREIGN PATENT DOCUMENTS

| | | | | |
|---|---|---|---|---|
| EP | 0078871 A1 | * | 11/1981 | |
| EP | 0246368 A1 | | 11/1987 | |
| EP | 3666859 A1 | * | 6/2020 | B01J 8/0045 |
| WO | WO-2021196852 A1 | * | 10/2021 | B65G 33/14 |

* cited by examiner

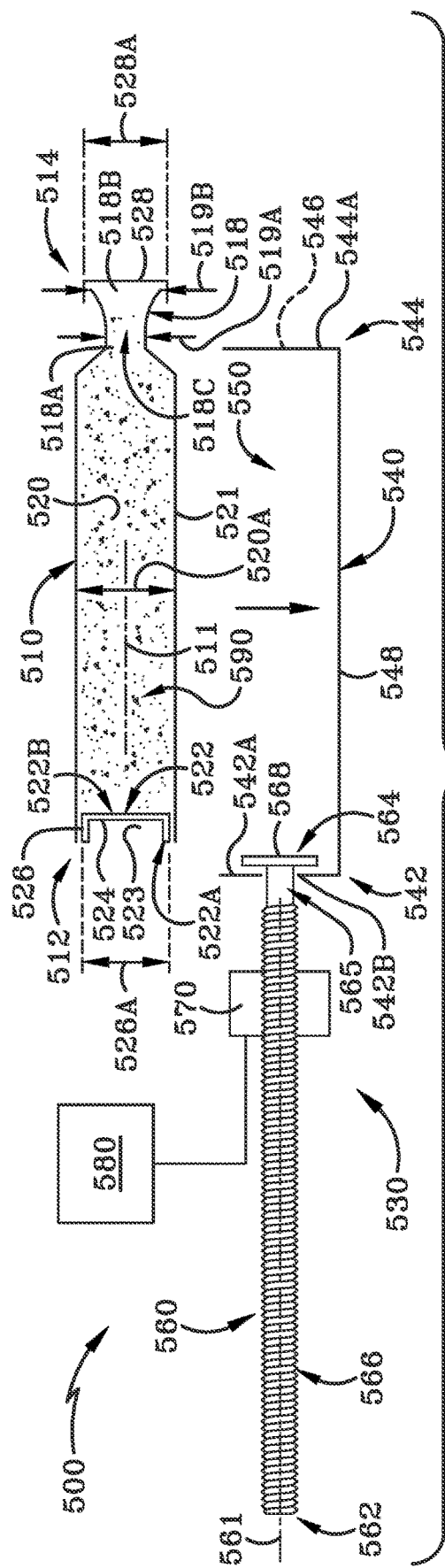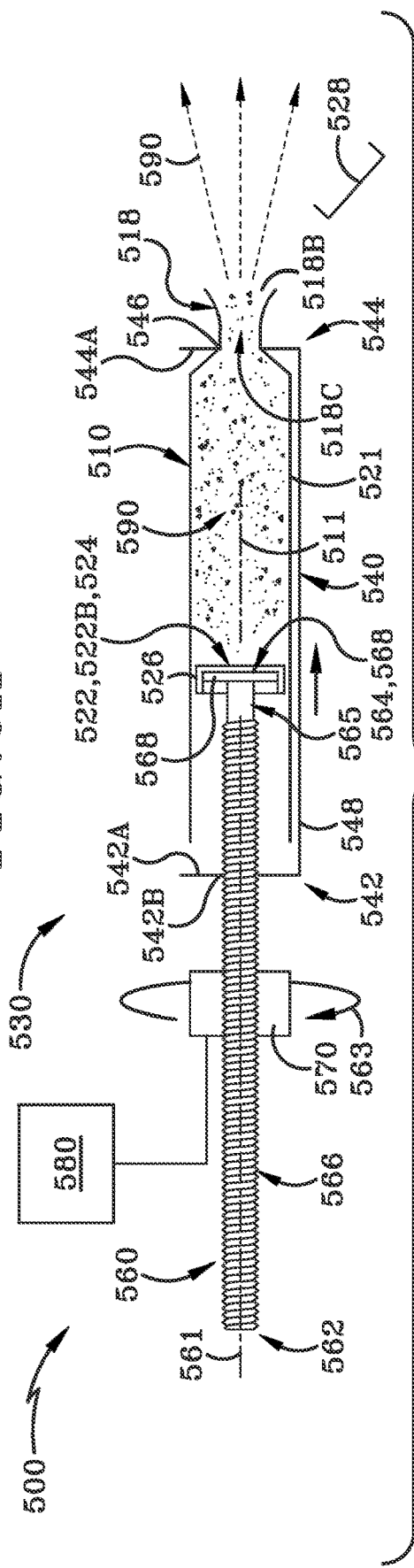
FIG.6A
FIG.6B

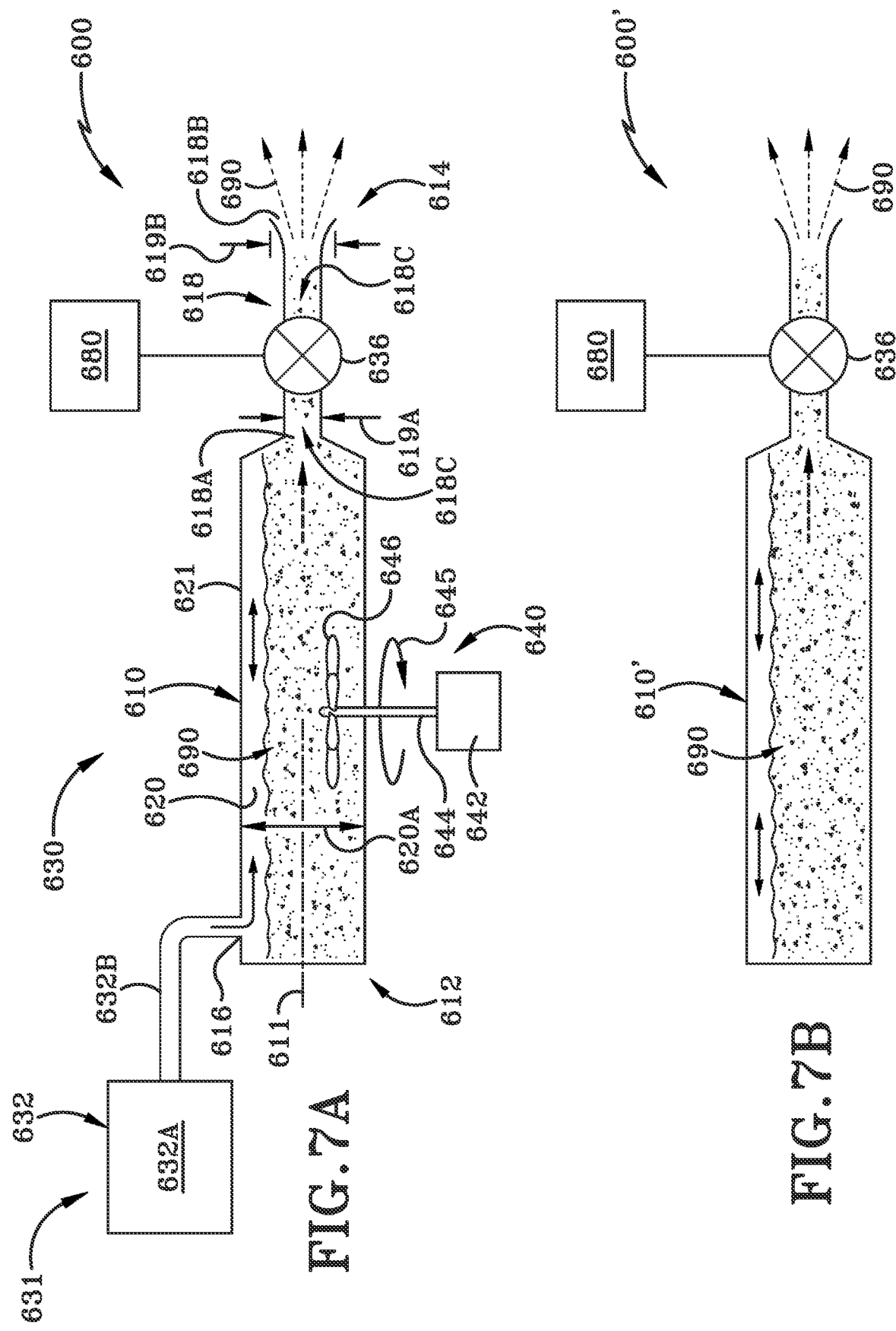

CHAFF DISPENSING SYSTEMS AND METHODS OF OPERATION

TECHNICAL FIELD

The present disclosure relates to chaff dispensing systems on an aircraft. More particularly, the present disclosure relates to chaff dispensing systems metering a volume of chaff material on an aircraft. Specifically, the present disclosure relates to chaff dispensing systems metering a volume of chaff material in variable volumes, discrete or incremental volumes, and continuous volumes from different packaging configurations on an aircraft.

BACKGROUND

In current military technology, chaff dispensing systems are generally housed along an aircraft to provide a radar countermeasure from incoming enemy threats. Prior to wartime of the aircraft, the chaff dispensing system located on the aircraft is pre-loaded with a volume of chaff material. The chaff material provided in the chaff dispensing system provides a distraction to an incoming enemy threat where the incoming enemy threat is diverted to the chaff material while allowing the aircraft to remain unscathed. During wartime, the aircraft may receive a warning from an on-board electronic warfare (EW) system regarding an incoming enemy threat approaching the aircraft. Upon a determination made by the on-board EW system, the chaff dispensing system dispenses and/or ejects a volume of chaff material at the trailing edge of the aircraft to divert the incoming enemy threat away from the aircraft. Such enablement of the chaff dispensing system may be used discretely depending on the amount of incoming enemy threats converging to the aircraft.

In conventional chaff dispensing systems, the volume of chaff material is disposed in pre-packaged cartridges or containers that are loaded into the chaff dispensing system located on the aircraft. Each pre-packaged cartridge or container holds a predetermined amount of chaff material based on the size, shape, and configuration of each cartridge or container. As such, the volume of chaff material disposed in each cartridge or container is limited. Given the general composition of chaff material being thin glass and metal dipoles, the efficiency of packaging the chaff material into conventional chaff cartridges and containers is less desirable given the limited allotted space on an aircraft when the aircraft is currently carrying additional payloads. Additionally, each cartridge or container loaded into the chaff dispensing system is completely used once the chaff dispensing system ejects the chaff material from a cartridge or container. In other words, the volume of chaff material dispensed from these cartridges or containers is dispensed entirely and cannot be dispensed variably or incrementally from a single cartridge or container. As such, the efficiency of limiting and conserving chaff material lacks in the current chaff dispensing systems when an aircraft utilizes the conventional pre-packaged cartridges or containers.

SUMMARY

Based on the conventional technology and current problems in the field of this invention as to efficiently storing and dispensing a volume of chaff material from a chaff dispensing system, an improvement is needed.

In one aspect, an exemplary embodiment of the present disclosure may provide a chaff dispensing system. The chaff dispensing system includes a container, a dispensing assembly, and a controller. The container has a first end, a second end, and a chamber that extends between the first and second ends, and the second end defines an ejection port. The container is adapted to retain a volume of chaff material. The dispensing assembly is provided on an aircraft, and the dispensing assembly is operably engaged to the container. The controller is electrically connected to the dispensing assembly. The volume of chaff material is dispensed by the dispensing assembly in metered volumes of chaff material in response to instructions or signals from the controller.

In another aspect, an exemplary embodiment of the present disclosure may provide a chaff dispensing system The chaff dispensing system includes a container, a dispensing assembly, and a controller. The container has a first end, a second end, and a chamber that extends between the first and second ends, and the second end defines an ejection port. The container is adapted to retain a volume of chaff material. The dispensing assembly is provided on an aircraft, and the dispensing assembly is operably engaged to the container. The controller is electrically connected to the dispensing assembly. The volume of chaff material is dispensed by the dispensing assembly in metered volumes of chaff material in response to instructions or signals from the controller. In addition, a first volume of chaff material may be metered at a first time and a second volume chaff material may be metered at a second time in which the second volume of chaff material is different than the first volume of chaff material.

In yet another aspect, an exemplary embodiment of the present disclosure may provide a method for ejecting metered volumes of chaff material from a chaff dispensing system on an aircraft. The method comprises the steps of providing a container that is adapted to retain a volume of chaff material; effecting the container to be loaded into a dispensing assembly on a vehicle; effecting the chaff dispensing system to initiate; effecting a first signal to be sent, by a controller, to the dispensing assembly to eject a first metered volume of chaff material in response to a detected threat; effecting the first metered volume of chaff material to be ejected from the vehicle.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 6A is a schematic view of another chaff dispensing system. The chaff dispensing system is disposed in a first position FIG. 6B is another schematic view of the chaff dispensing system illustrated in FIG. 6A. The chaff dispensing system is disposed in a second position.

FIG. 7A is a schematic view of another chaff dispensing system.

FIG. 7B is a schematic view of an alternative chaff dispensing system similar to the chaff dispensing system illustrated in FIG. 7A.

Similar numbers refer to similar parts throughout the drawings.

DETAILED DESCRIPTION

Figure 1:
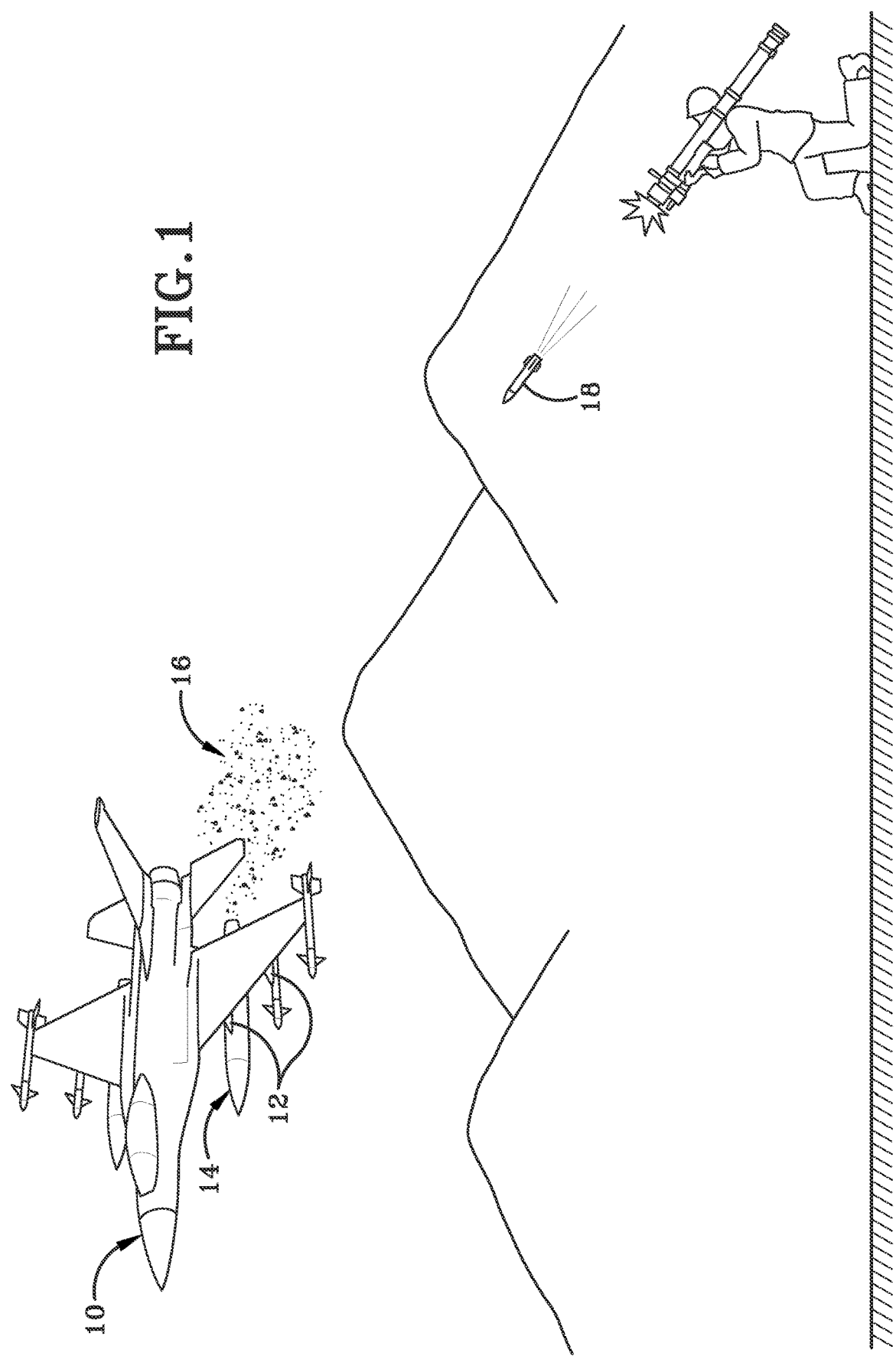
FIG. 1 is a theatric view of an aircraft ejecting a metered volume of chaff material based upon an incoming threat.

FIG. 1 illustrates a vehicle, platform or aircraft 10, which may be manned or unmanned, that includes a plurality of pylons 12 attached underneath the wings of the aircraft 10 or at another location of the aircraft. Each pylon of the plurality of pylons 12 is electrically connected to a power source (not illustrated) disposed on the aircraft 10 to provide electrical power to any device or payload that is mounted to a pylon in the plurality of pylons 12. In addition, each pylon of the plurality of pylons 12 is sized and configured to receive and hold a chaff dispensing system, such as chaff dispensing system 14. The chaff dispensing system 14 may be any chaff dispensing system that is described and illustrated herein. Upon mounting the chaff dispensing system 14, the chaff dispensing system 14 is electrically connected to the power source of the aircraft 10 at the selected pylon of the plurality of pylons 12 to provide power to all electrical components in the chaff dispensing system 14, which is described in more detail below.

Figure 2:
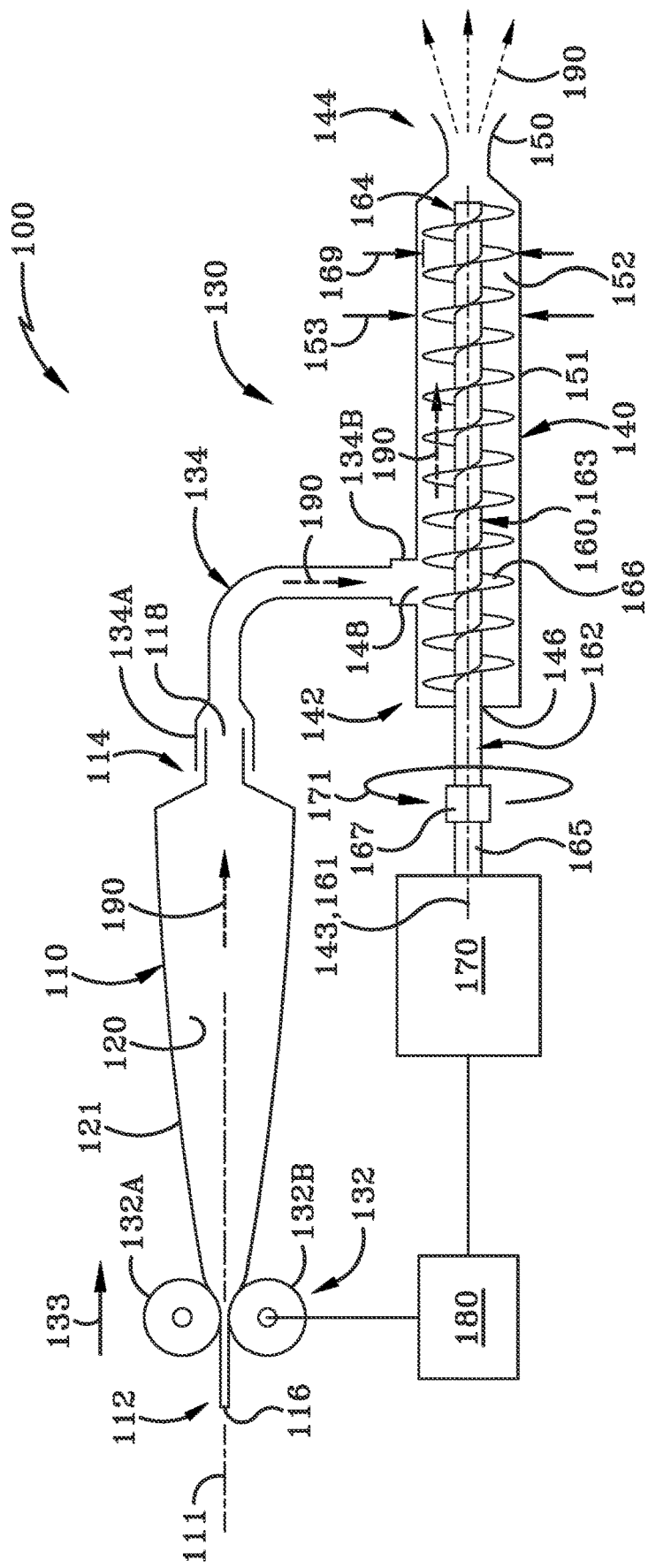
FIG. 2 is a schematic view of a chaff dispensing system.

Prior to wartime or an aerial mission of the aircraft 10, the chaff dispensing system 14 is pre-loaded with a volume of chaff material 16 and mounted to a pylon on a plurality of pylons 12. The chaff material 16 provided in the chaff dispensing system 14 provides a distraction to an incoming enemy threat 18 where the incoming enemy threat 18 is diverted to the chaff material 16 while allowing the aircraft to remain unscathed. During wartime or an aerial mission, the aircraft may receive a warning from an onboard electronic warfare (EW) system regarding the incoming enemy threat 18 approaching the aircraft 10. Upon a determination made by the on-board EW system, the chaff dispensing system 14 dispenses and/or ejects a volume of chaff material 16 from the aircraft that is behind, or to side of, the aircraft 10. In one exemplary embodiment, a volume of chaff material may be ejected at the trailing edge of a pylon or on the side of a pylon to divert an incoming enemy threat away from the aircraft. The chaff dispensing system 14 may also be provided along any suitable location of the aircraft 10 other than the plurality of pylons 12. In one exemplary embodiment, a chaff dispensing system may be provided within a wing of an aircraft. In another exemplary embodiment, a chaff dispensing system may be provided in a fuselage or a pod disposed on an aircraft. In another exemplary embodiment, a chaff dispensing system may be provided on a separate device operably engaging an aircraft 10 (e.g., a towable device), FIG. 2 illustrates a chaff dispensing system 100. The chaff dispensing system 100 includes a container 110, a dispensing assembly 130, a controller 180, and a volume of chaff material, which is denoted by arrows 190.

The container 110 includes a first end 112, a second end 114 that directly opposes the first end 112, and a longitudinal axis 111 that extends from the first end 112 to the second end 114. The container 110 includes an inlet port 116 disposed at the first end 112 of the container 110. The container 110 also includes an ejection portion 118 at the second end 114 of the container 110. The ejection port 118 is sized and configured to attach to a connecting member 134 of the dispensing assembly 130, which is also described in more detail herein. The container 110 also includes a first chamber 120 defined by a circumferential wall 121. The chamber 120 extends from the inlet port 116 of the container 110 to the ejection port 118 of the container 110. The first chamber 120 is sized and configured to receive and house the volume of chaff material 190.

The volume of chaff material 190 may be loaded into the first chamber 120 of the container 110 in any suitable method of technique. In one exemplary embodiment, the chaff material 190 may be loaded into the first chamber 120 of the container 110 through the inlet port 116 of the container 110 prior to the connection between the container 110 and the dispensing assembly 130. In another exemplary embodiment, the chaff material 190 may be loaded into the first chamber 120 of the container 110 through the ejection portion 118 of the container 110 prior to the connection between the container 110 and the dispensing assembly 130. In yet another exemplary embodiment, the chaff material 190 may be loaded into the first chamber 120 of the container 110 through a port or opening disposed at a location between the inlet port 116 or the ejection port 118 prior to connection of the container 110 with the dispensing assembly 130. Once the volume of chaff material 190 is loaded into the container 110 through a selected port or opening of the container 110, the selected port or opening is sealed such that volume of chaff material 190 remains inside of the chamber 120 of the container 110. Such seal on the container 110 may be removed once the container 110 is connected to the dispensing assembly and is disposed within a pod on the aircraft 10, which is also described in more detail below.

Furthermore, the volume of chaff material 190 may be mixed with additional material and/or substances when the volume of chaff material 190 is disposed inside the container 120. The additional material and/or substances mixed with the volume of chaff material 190 may allow the volume of chaff material 190 to take on a more fluid-like composition that helps move and eject the volume of chaff material 190 from the container 120 and the chaff dispensing system 100 as a whole. In one exemplary embodiment, a volume of chaff material that is loaded into a container may be suspended in a carrier fluid or a fine particle matrix to act like to a fluid material. The use of carrier fluid or fine particle matrix is dependent upon the composition of the chaff material. In another exemplary embodiment, the volume of chaff material that is loaded into a container may use a vibrational energy input to "fluidize" the chaff material in which the volume of chaff material may require "help" (through external excitation or carrier fluid) to have the composition of a fluid.

The dispensing assembly 130 includes a roller assembly 132. The roller assembly 132 directly contacts and interfaces with the container 110 at the first end 112 of the container 110 upon installation of the container 110 onto the aircraft 10. In one exemplary embodiment, such as the embodiment in FIG. 2, the roller assembly 132 may include a first roller 132A and a second roller 132B. The first roller 132A is disposed parallel to the second roller 132B and oppose each other relative to the longitudinal axis 111 of the container 110. Each of the first roller 132A and the second roller 132E exert a pressing force against the container 110 that is directed towards to the longitudinal axis 111 of the container 110. During operation, the first and second rollers 132A, 132B rotate in opposite directions while progressing from the first end 112 of the container 110 towards the second end 114 of the container 110. Such progression of the first and second rollers along the container 110 is represented by an arrow 133. In one exemplary embodiment, the first roller 132A rotates in a clockwise direction, and the second roper 132B rotates in the opposite, counter-clockwise direction relative to the first roller 132A. Such difference in rotation between the first and second rollers 132A, 132B allows for the first and second rollers 132A, 132B to equally assert a force at the same location against the container 110. The configuration between roller assembly 132 and the container 110 allows for the volume of chaff material 190 to transition from the first chamber 120 of the container 110, towards the second end 114 of the container 110, and through the ejection port 118 of the container 110 to transition outside of the container 110.

While an exemplary embodiment, such as the embodiment illustrated in FIG. 2, illustrates that the roller assembly 132 includes the first and second rollers 132A, 132B, any suitable number of rollers may be included in a roller assembly for a chaff dispensing system. Examples of suitable numbers of rollers that may be included in a roller assembly for a chaff dispensing system include at least one, a plurality, two, three, four, five, six, or any other suitable number of rollers in a roller assembly for a chaff dispensing system. In addition, the roller assembly 132 may include additional components for guiding and/or leading the roller assembly along the container 110 for ejecting the volume of chaff material 190 from the container 110. In one exemplary embodiment, a roller assembly may be coupled to a rail system that extending linearly along a container and is parallel to the longitudinal axis of the container. Such rail system may guide or lead the roller assembly along the container to provide a suitable and equal volume of force against the container to eject the volume of chaff material.

In one exemplary embodiment, the container 110 is made of a flexible, pliable material. Such flexibility and pliability of the container 110 allows the roller assembly 132 of the dispensing assembly 130 to compress the container 110 such that the volume of chaff material 190 from the chamber 120 and progresses to ejection port 118 to eject the volume of chaff material 190. In addition, the material of the container 110 may be any suitable flexible and/or pliable material that will contain the volume of chaff material 180 for the chaff dispensing system 100. Examples of suitable materials to make a container in a chaff dispensing system flexible or pliable may be considered.

In addition, the roller assembly 132 is electrically connected to the controller 180 such that the controller 180 initiates and controls the operation of the roller assembly 132 during wartime of the chaff dispensing system 100. The controller may be in electrical communication with logic of the counter measure dispensing system (CMDS) on the aircraft 10 and receive instructions therefrom to initiate the dispensing of the volume of chaff 190 in response to a boated or detected threat. In the illustrated embodiment, the roller assembly 132 includes an ON state and an OFF state that is initiated and controlled by the controller 180 through an on-board EW system located on the aircraft 10. In the OFF state, the roller assembly 132 remains stationary to prevent any volume of chaff material 190 to progress through the chamber 120 of the container 110 and out the ejection port 118. In the ON state, the roller assembly 132 provides the capability of exerting a force against the volume of chaff material 190 to move the chaff material 190 from the container 110. Once the volume of chaff material 190 is determined suitable by the controller 180, the roller assembly 132 is enabled to the OFF state, via the controller 180, to prevent any additional volume of chaff material 190 to progress through the chamber 120 of the container 110 and out the ejection port 118.

The chaff dispensing system 100 includes a connecting member 134. The connecting member 134 includes a first end 134A that connects to the ejection port 118 of the container 110, and a second end 134E that disposed opposite to the first end 134A of the connecting member 134. The connecting member 134 also includes a passageway 134C that is disposed between the first end 134A and the second end 134B. The passageway 134C provides communication between the first end 134A and the second end 134B in the connecting member 134. In addition, the connecting member 134 provides fluid communication between the container 110 and the dispensing assembly 130 to move the volume of chaff material 190 from the container 110 to the dispensing assembly 130.

The dispensing assembly 130 includes a dispenser 140. The dispenser 140 includes a first end 142, a second end 144 disposed directly opposite to the first end 142, and a longitudinal axis 143 that extends between the first and second ends 142, 144 of the dispenser 140. The dispenser 140 includes a first inlet opening 146 disposed at the first end 142 of the dispenser 140. The first inlet opening 146 is sized and configured to moveably dispose an auger 160 of the dispensing assembly 130, which is described in more detail below. The dispenser 140 also includes a second inlet opening 148 disposed between the first end 142 and the second end 144 of the dispenser 140. The second inlet opening 148 is sized and configured to operably engage the second end 134B of the connecting member 134. Such engagement between the dispenser 140 and the connecting member 134 provides fluid communication between the container 110 and the dispenser 140 such that that ejection port 118 of the container 110 is in fluid communication with the second inlet opening 148 of the dispenser 140. The dispenser 140 further includes an ejection nozzle 150 disposed at the second end 144 of the dispenser 140. The ejection nozzle 150 is sized and configured to disperse the metered volume of chaff material 190 upon initiation of the chaff dispensing system 100. The dispenser 140 also includes a chamber 152 defined by a circumferential wall 151 that is disposed between each of the first inlet opening 146, the second inlet opening 148, and the ejection nozzle 150 to house a metered volume of chaff material 160. The circumferential wall 151 also defines a first diameter 153 extending between the first end 142 of the dispenser 140 to the second end 144 of the dispenser 140.

The dispensing assembly 130 includes an auger 160. The auger 160 defines a first end 162, a second end 164 this disposed directly opposite to the first end 162, a longitudinal axis 161 that extends between the first and second ends 162, 164 of the auger 160 and is parallel to the longitudinal axis 143 of the dispenser 140, and an exterior surface 163. The auger 160 is connected to a drive shaft 165 that extends from the drive mechanism 170 via a coupler 167. As illustrated in FIG. 2, the first end 162 of the auger 160 attaches to the coupler 167. The auger 160 includes a blade 166 that is disposed helically about the longitudinal axis 161 on the exterior surface 163 of the auger 160. The blade 166 is defined from the second end 162 of the auger 160 and extends towards the first end 162 of the auger 160 to a location between the first and second ends 162, 164. The blade 166 is sized and configured to directly contact the volume of chaff material 190 in order to eject a metered volume of chaff material 190 from the dispenser 140, which is described in more details below. In addition, the blade 166 defines a second diameter 169 that is substantially equal to the first diameter 153 of the circumferential wall 151 in which the auger 160 does not contact the circumferential wall 151 of the dispenser 140. Such configuration between the auger 160 and the dispenser 140 prevents the volume of chaff material 190 from escaping around the blade 166 of the auger 160 towards the first end 142 of the dispenser 140. While FIG. 2 illustrates a gap between the auger 160 and the dispenser 140, the gap is only used for illustrative purposes to clearly illustrate the auger 160 being disposed within the chamber 152 of the dispenser 140. It will be understood that the gap illustrated in FIG. 2 is used for clarity only and does not limit the configuration of the auger 160 and the dispenser 140 in the presented embodiment.

The dispenser 140 also includes a drive mechanism 170. The drive mechanism 170 is mechanically linked to a motor (not illustrated) that provides power to operate the drive mechanism 170 during operation of the chaff dispensing system 100. The drive mechanism 170 and the motor is electrically connected to the power source located on the pylon of the plurality of pylons 12. In this illustrated embodiment, the drive mechanism 170 is configured to complement the drive shaft 165 to allow the drive mechanism 170 to apply a rotational force on the drive shaft 165. The drive shaft 165 then transfers the rotational force to the auger 160, via the coupler 167, to rotate the auger 160 within the second chamber 152 of the dispenser to eject the metered volume of chaff material 190 outside of the dispenser 140. Such rotation caused by the drive mechanism 170 onto the drive shaft 165 and the auger 160 is shown by arrows referred to as 171.

In addition, the drive mechanism 170 and motor are electrically connected to the controller 180 such that the controller 180 initiates and controls the operation of the drive mechanism 170 and motor during wartime. In the illustrated embodiment, each of the drive mechanism 170 and motor has an ON state and an OFF state that is controlled by the controller 180 through the on-board electronic warfare (EW) system located on the aircraft 10. In the OFF state, the drive mechanism 170 remains stationary to prevent any volume of chaff material 190 to progress through the chamber 152 of the dispenser 140 and out the ejection nozzle 150. In the ON state, the drive mechanism 170 provides the capability of measuring and/or metering a measured volume of chaff material 190 to the dispenser 140. Such metered volumes of chaff material 190 may vary and is determined by the controller 180 during use of the chaff dispensing system 100. Once the metered volume of chaff material 190 is determined suitable by the controller 180, the drive mechanism 170 is in the OFF state, via the controller 180, to prevent any volume of chaff material 190 to progress through the chamber 152 of the dispenser 140 and out the ejection nozzle 150.

Having now described the components in the chaff dispensing system 100, a method of use for the chaff dispensing system 100 is described in detail below.

Prior to installing the container 110 onto a pylon of the plurality of pylons 12 of the aircraft 10, the container 110 is filled with a volume of chaff material 190. The volume of chaff material 190 included in the container 110 may be of any suitable volume for a particular embodiment of the chaff dispensing system 100, including the type of mission that will be performed by the aircraft 10. Once the container 110 is filled with the volume of chaff material 190 and is sealed, the container 110 may be loaded on the aircraft 10 at a location that includes the dispensing assembly 130 (e.g. onto a pylon of the plurality of pylons 12, underneath a wing of the aircraft, on a fuselage mounting point, etc.). Upon loading, the connecting member 134 is connected to the ejection port 118 of the container 110 such that the container 110 is fluidly connected to the dispensing assembly 130. Once the container 110 is provided on the aircraft 10 and is in communication with the dispensing assembly 130, the chaff dispensing system 100 is ready for operation during flight and wartime of the aircraft 10.

During flight and wartime or aerial mission of the aircraft 10, the on-board EW system of the aircraft 10 may initiate the chaff dispensing system 100 that is part of the CMDS, either manually or autonomously. Such initiation of the chaff dispensing system 100 by the on-board EW system is operated through the controller 180 to dispense and eject a metered volume of chaff material 190 from the chaff dispensing system 100. The on-board EW system may initiate the chaff dispensing system 100 upon receiving an incoming enemy threat. Upon initiation, the controller 180 sends a first signal to the roller assembly 132 to exert a pressing force at the first end 112 of the container 110 to move the volume of chaff material 190 from the first chamber 120 towards the ejection port 118. The first signal sent by the controller 180 may be continuously relayed to the roller assembly 132 to continuously exert the pressing force against the volume of chaff material 190. Such continual exertion of pressure on the volume of chaff material 190 provides immediate access of chaff material 190 for the dispenser 140. During the exertion of the pressing force by roller assembly 132, the volume of chaff material 190 is then ejected from the first chamber 120 at the ejection port 118 of the container 110 and transitions through the connecting member 134 towards the dispenser 140.

As the volume of chaff material 190 transitions through the connecting member 134, the volume of chaff material 190 is maintained in the connecting member 134 due to the drive mechanism 170 being defined in its OFF state. The OFF state of the drive mechanism 170 is controlled by the controller 180 due to the drive mechanism 170 being operably connected to the controller 180. Once the on-board EW system determines that ejection of the volume of chaff material 190 is necessary, the controller 180 will send a signal to the drive mechanism 170 to activate the drive mechanism 170 to the ON state. The ON state of the drive mechanism 170 allows for the volume of chaff material 190 to transition through the chamber 152 of the dispenser 140 by the drive mechanism 170 rotating the auger 160 about its longitudinal axis 161. Such rotation of the auger 160 is shown by arrows 171. During this state, the drive mechanism 170 maintains the ON state through the controller 180 in which a metered volume of chaff material 190 is ejected from the dispenser 140 at the ejection nozzle 150 upon rotation of the auger 160. Once a suitable metered volume of chaff material 190 has been dispensed into the exterior environment of the chaff dispensing system 100, the controller 180 sends a second signal to the drive mechanism 170 to enable the drive mechanism 170 to the OFF state, which stops the rotation of the auger 160. Such metering of the chaff material 190 is determined by the on-board EW system on the aircraft 10, through the use of the controller 180, where the metering of the chaff material 190 is based upon certain variables and/or parameters the aircraft 10 is experiencing during wartime (e.g., deterring an incoming threat).

Furthermore, the ON and OFF state of each of the roller assembly 132 and drive mechanism 170 that is enabled by the controller 180 may be repeated until the container 110 is empty and no longer contains a volume of chaff material 190. As such, the controller 180 may send signals to the roller assembly 132 and drive mechanism 170 to eject and dispense different metered volumes of chaff material 190 upon the parameters the aircraft 10 is experiencing during wartime. For example, first and second metered volumes of chaff material 190 may be ejected and dispensed from the chaff dispensing system 100 at different times based on the determination from the on-board EW system. In this example, the first and second metered volumes of chaff material 190 may be equal or different in volumes based on the parameters determined by the on-board EW system (e.g., deterring and diverting an incoming threat).

The chaff dispensing system 100 is considered advantageous at least because the chaff dispensing system 100 is able to variably, continuously, and discretely dispense and eject volumes of chaff material 190 based on warnings detected by the on-board EW system. The dispensing assembly 130, via the roller assembly 132, is able to continuously or variably exert a force onto the volume of chaff material 190 directed to the dispenser 140 and the auger 160 to provide the auger 160 with an immediate volume of chaff material 190. Additionally, the auger 160 may continuously, variably, or discretely eject a metered amount of chaff material 190, via the drive mechanism 170, from the chaff dispensing system 100 based on the determinations made by the on-board EW system. In one exemplary embodiment, the auger 160 may eject a first volume of chaff material at a first time based on an incoming threat detected by the on-board EW system and then a second volume of chaff material at a second time based on the same or another incoming threat detected by the on-board EW system. Here, the first volume of chaff material may be greater, less than, or equal to the second volume of chaff material ejected by the chaff dispensing system 100.

Figure 3A:
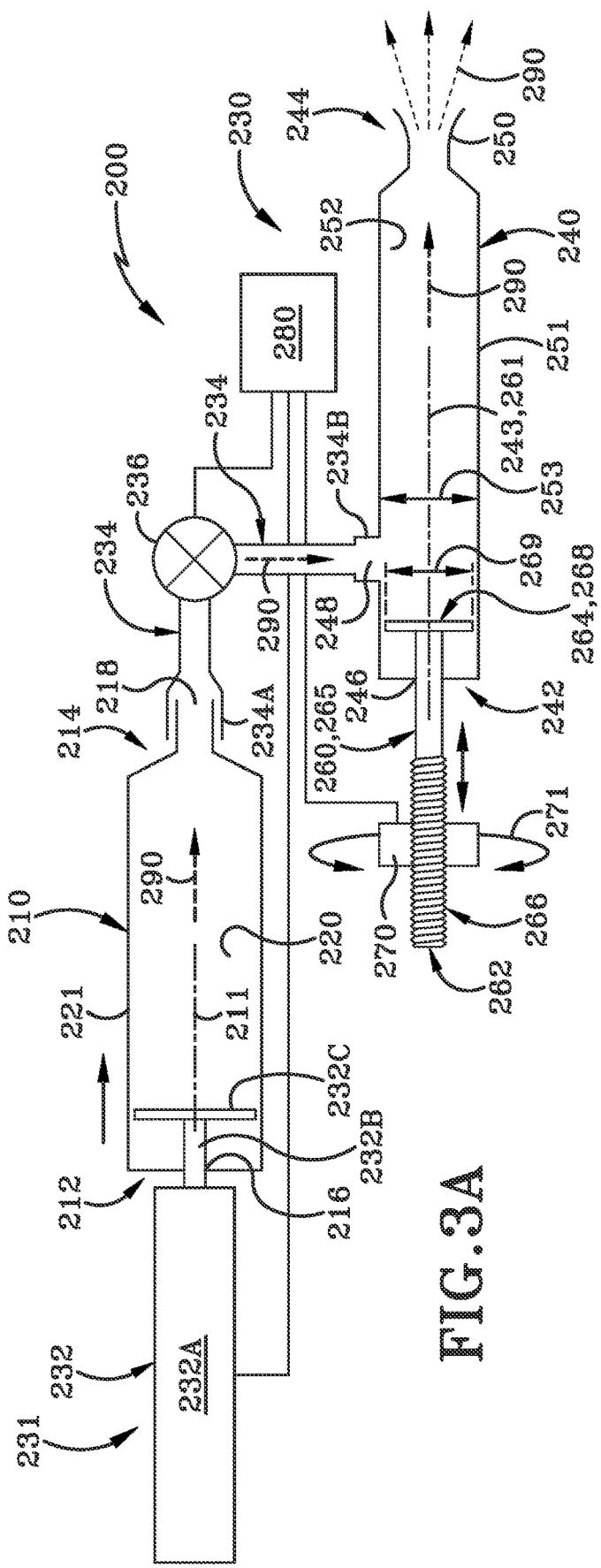
FIG. 3A is a schematic view of another chaff dispensing system.
Figure 3B:
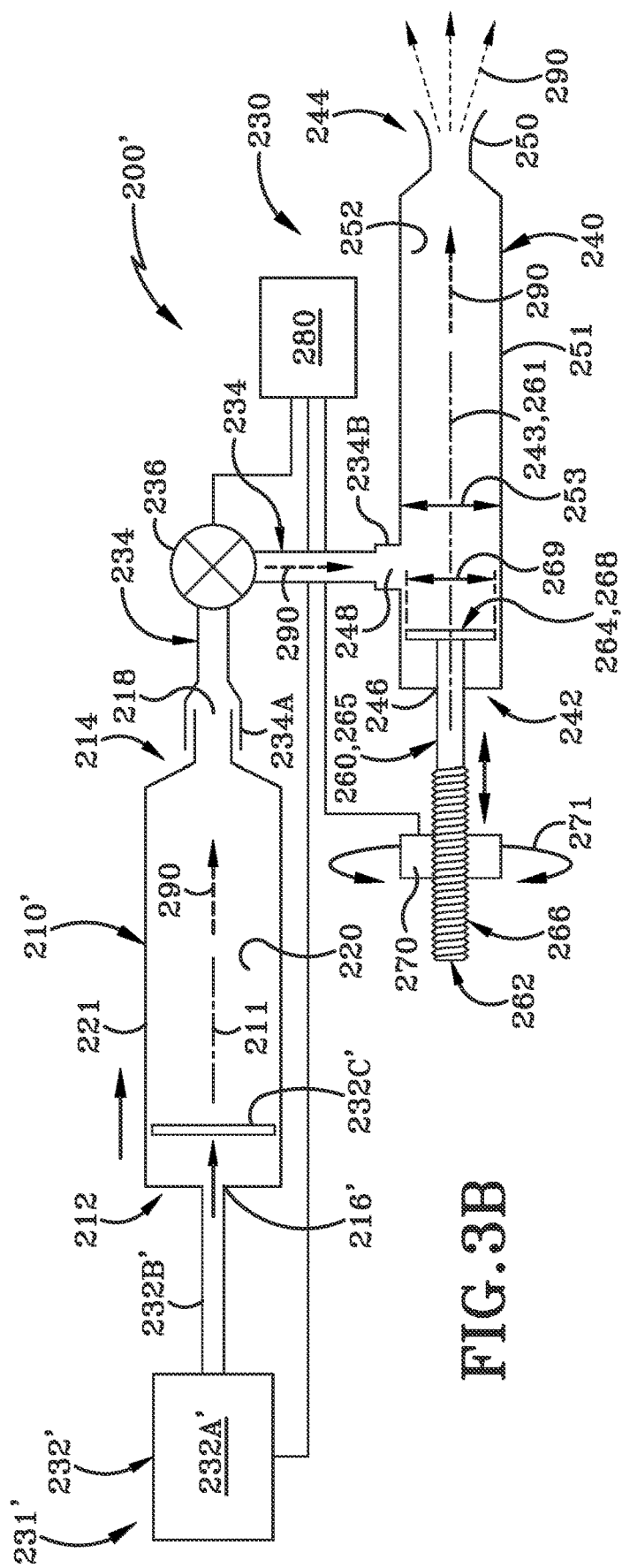
FIG. 3B is a schematic view of an alternative chaff dispensing system similar to the chaff dispensing system illustrated in FIG. 3A.

FIGS. 3A and 3B illustrate another chaff dispensing system 200. The chaff dispensing system 200 is similar to the chaff dispensing system 100 as illustrated in FIG. 2, except as described below. The chaff dispensing system 200 includes a container 210, a dispensing assembly 230 that includes a pressure source 231, a controller 280, and a volume of chaff material 290.

The container 210 includes a first end 212, a second end 214 that directly opposes the first end 212, and a longitudinal axis 211 that extends from the first end 212 to the second end 214. The container 210 includes an inlet port 216 disposed at the first end 212 of the container 210, and an ejection portion 218 disposed at the second end 214 of the container 210 that opposes the inlet port 216. The ejection port 218 is sized and configured to eject the volume of chaff material 190 from the container 110. The container 210 also includes a chamber 220 that is defined by a circumferential wall 221. The chamber 220 extends from the inlet port 216 of the container 210 to the ejection port 218 of the container 210. The chamber 220 is sized and configured to receive and house the volume of chaff material 290.

The chaff material 290 may be loaded into the chamber 220 of the container 210 in any suitable method of technique. In one exemplary embodiment, the chaff material 290 may be loaded into the chamber 220 of the container 210 through the inlet port 216 of the container 210 prior to the connection between the container 210 and the dispensing assembly 230. In another exemplary embodiment, the chaff material 290 may be loaded into the first chamber 120 of the container 210 through the ejection portion 218 of the container 210 prior to the connection between the container 210 and the dispensing assembly 230. In yet another exemplary embodiment, the chaff material 290 may be loaded into the chamber 220 of the container 210 through a port or opening disposed at a location between the inlet port 216 or the ejection port 218 prior to connection of the container 210 with the dispensing assembly 230.

The dispensing assembly 230 includes a pressure source 231 that is connected to the inlet port 216 of the container 210. The configuration of the connection between the pressure source 231 and the container 210 provides a first pressure against the volume of chaff material 290 at the first end 212 of the container 210. The first pressure exerted by the pressure source 231 moves the chaff material 290 from the chamber 220 of the container 210, towards the second end 214 of the container 210, and through the ejection port 218 of the container 210 to transition the chaff material 290 outside of the container 210. The pressure source 231 may be configured and arrangement in any suitable way in the dispensing assembly 230. In one exemplary embodiment, a pressure source may be external to a dispensing assembly such that the pressure source is disposed exterior to a pod or payload that is housing a chaff dispensing system. In another exemplary embodiment, a pressure source may be internal to a dispensing assembly such that the pressure source is disposed inside a pod or payload that is housing a chaff dispensing system.

The container 210 is made of a rigid material. Such rigidity of the container 210 allows for a pressure source, such as external pressure source 231, of the dispensing assembly 230 to exert pressure into the container 210 to move the volume of chaff material 290 from the chamber 220 and to eject the volume of chaff material 290 through the ejection port 218, which is described in more detail below. The rigidity of the container 210 prevents any deformation or flexibility when pressure is applied by a pressure source in the chamber 220 of the container 210, which is different as compared to the container 110 in the chaff dispensing system 100. Furthermore, the material of the container 210 may be any suitable rigid material that will contain the volume of chaff material 280 for the chaff dispensing system 200.

The pressure source 231 in the dispensing assembly 230 may be any, suitable device or apparatus that is able to exert a first pressure against the chaff material 290 to move the volume of chaff material 290 outside of the chamber 220 of the container 210. FIG. 3A illustrates an exemplary embodiment where the first pressure exerted on the volume of chaff material 290 generated by the pressure source 231 may be a pneumatic piston 232. The pneumatic piston 232 includes a pneumatic actuator 232A that exerts force onto a shaft 232B. The pneumatic piston 232 includes a head 232C disposed on the shaft 232B opposite to the pneumatic actuator 232A that is used to exert the first pressure against the volume of chaff material 290. As such, the head 232C would be moveably disposed at the inlet port 216 of the container 210 to exert a pushing pressure against the volume of chaff material 290 such the volume of chaff material 290 is ejected from the container 210. FIG. 3B illustrates another exemplary embodiment of a chaff dispensing system 200' where the first pressure exerted on the volume of chaff material 290 generated by the pressure source 231' may be an air compressor 232'. The air compressor 232' includes a pneumatic actuator 232A' that exerts force through a pipe 232B' against a pressure plate 232C'. The pressure plate 232C' is disposed opposite to the pneumatic actuator 232A' and is used to exert the first pressure against the volume of chaff material 290. As such, the pressure plate 232C' would be moveably disposed at the inlet port 216 of the container 210 to exert a pushing pressure against the volume of chaff material 290 such the volume of chaff material 290 is ejected from the container 210. The diameter of the head 232C of the pneumatic piston 232 is substantially equal to the diameter of the circumferential wall 221 of the container 210 in which the head 232C does not contact the circumferential wall 221 of the container 210. Such configuration between the head 232C and the container 210 prevents the volume of chaff material 290 from escaping around the head 232C of the pneumatic piston 232 towards the first end 212 of the container 210. While FIG. 3A illustrates a gap between the head 232C and the circumferential wall 221 of the container 210, the gap is only used for illustrative purposes to clearly illustrate the head 232C being disposed within the chamber 220 of the container 210. It will be understood that the gap illustrated in FIG. 3A is used for clarity only and does not limit the configuration of the head 232C and the container 210 in the presented embodiment.

Similarly, the diameter of the pressure plate 232C' of the air compressor 232' is substantially equal to the diameter of the circumferential wall 221 of the container 210 in which the pressure plate 232C' does not contact the circumferential wall 221 of the container 210. Such configuration between the pressure plate 232C' and the container 210 prevents the volume of chaff material 290 from escaping around the pressure plate 232C' towards the first end 212 of the container 210. While FIG. 3B illustrates a gap between the pressure plate 232C' and the circumferential wall 221 of the container 210, the gap is only used for illustrative purposes to clearly illustrate the pressure plate 232C' being disposed within the chamber 220 of the container 210. It will be understood that the gap illustrated in FIG. 3B is used for clarity only and does not limit the configuration of the pressure plate 232C' and the container 210 in the presented embodiment.

While the chaff dispensing system 200 includes the pressure source 231 to eject the volume of chaff material 290 to the dispenser 240 via a pneumatic system, any suitable mechanism and/or system may be used to eject a volume of chaff material to a dispenser in a chaff dispensing system. In one exemplary embodiment, a chaff dispensing system may include a hydraulic device, such as a hydraulic piston, that is configured to eject a volume of chaff material to a dispenser in a chaff dispensing system. In another exemplary embodiment, a chaff dispensing system may include an electro-mechanical drive system that is configured to eject a volume of chaff material to a dispenser in a chaff dispensing system. Such electro-mechanical drive systems may include the electro-mechanical drive systems that are described herein and other suitable electro-mechanical drive systems for this particular embodiment.

The chaff dispensing system 200 includes a connecting member 234. The connecting member 234 includes a first end 234A that connects to the ejection port 218 of the container 210, and a second end 234B that connects that opposes the first end 234A of the connecting member 234. The connecting member 234 also includes a passageway (not illustrated) that is disposed between the first end 234A and the second end 2348. The passageway provides communication between the first end 234A and the second end 234B in the connecting member 234. In addition, the connecting member 234 provides fluid communication between the container 210 and the dispensing assembly 230 to move the volume of chaff material 190 from the container 210 to the dispensing assembly 230.

In addition, a regulating valve 236 is disposed along the connecting member 234 between the first end 234A and the second end 234B of the connecting member 234. The regulating valve 236 is electrically connected to the controller 280 in the chaff dispensing system 200. In this illustrated embodiment, the regulating valve 236 has an open state and a closed state that is controlled by the controller 280 through an on-board electronic warfare (EW) system located in the aircraft 10. In the closed state, the regulating valve 236 prevents any volume of chaff material 290 to progress toward the second end 234B of the connecting member 234. In the open state, the regulating valve 236 provides the capability of measuring and/or metering a measured volume of chaff material 290 to the dispenser 240. Such metered volumes of chaff material 290 may vary and may be determined by the controller 280 during use of the chaff dispensing system 200. Once the metered volume of chaff material 290 is determined suitable by the controller 280, the regulating valve 236 is in the closed state to prevent any volume of chaff material 290 to progress toward the second end 234B of the connecting member 234.

The dispensing assembly 230 includes a dispenser 240. The dispenser 240 includes a first end 242, a second end 244 disposed directly opposite to the first end 242, and a longitudinal axis 243 that extends between the first and second ends 242, 244 of the dispenser 240. The dispenser 240 includes a first inlet opening 246 disposed at the first end 242 of the dispenser 240, The dispenser 240 also includes a second inlet opening 248 disposed between the first end 242 and the second end 244 of the dispenser 240. The second inlet opening 248 is sized and configured to operably engage the second end 243B connecting member 234. Such engagement between the dispenser 240 and the connecting member 234 provides fluid communication between the container 210 and the dispenser 240 such that that ejection port 218 of the container 210 is in fluid communication with the second inlet opening 248 of the dispenser 240. The dispenser 240 further includes an ejection nozzle 250 disposed at the second end 244 of the dispenser 240. The ejection nozzle 250 is sized and configured to disperse a metered volume of chaff material 290 upon initiation of the chaff dispensing system 200, which is also described in more detail below. The dispenser 240 also includes a chamber 252 that defined by a circumferential wall 251. The chamber 252 is disposed between each of the first inlet opening 246, the second inlet opening 248, and the ejection nozzle 250 to house the metered volume of chaff material 290. The chamber 252 also defines a first diameter 254 that is constant between the first end 242 of the dispenser 240 to the ejection nozzle 250 of the dispenser 240.

The dispensing assembly 230 includes a plunging piston 260. The plunging piston 260 defines a first end 262, a second end 264 this disposed directly opposite to the first end 262, a longitudinal axis 261 that extends between the first and second ends 262, 264 of the plunger piston 260, and a shaft 265 that is defined between the first and second ends 262, 264 of the plunging piston 260. The plunging piston 260 includes a lead screw 266 that is disposed circumferentially about the shaft 265. The lead screw 266 is defined from the first end 262 of the plunging piston 260 and extends towards the second end 264 of the plunging piston 260 to a location between the first and second ends 262, 264. Furthermore, the plunging piston 260 is movably attached to the first inlet opening 246 of the dispense 240 to allow the plunging piston 260 to move from a first position to a second position, which is described in more details below.

The plunging piston 260 also includes a head 268 that is disposed on the shaft 265 at the second end 264 of the plunging piston 260. The head 268 of the plunging piston 260 also defines a second diameter 269 that is substantially equal to the first diameter 253 of the chamber 252 defined by the circumferential wall 251. The configuration of head 268 and the chamber 252 allows the head 258 to transition from the first end 242 of the dispenser 240 towards the second end 244 of the dispenser 240 while preventing the metered volume of chaff material 290 to progress past the head 268, towards the first end 242 of the dispenser 240, and being maintained in the chamber 252. While FIGS. 3A and 3B illustrate a gap between the head 268 and the circumferential wall 251 of the dispenser 240, the gap is only used for illustrative purposes to clearly illustrate the head 268 being disposed within the chamber 252 of the dispenser 240. It will be understood that the gap illustrated in FIGS. 3A and 3B are used for clarity only and does not limit the configuration of the head 268 and the dispenser 240 in the presented embodiment.

Furthermore, the dispenser 240 includes a drive mechanism 270. The drive mechanism 270 is mechanically linked to a motor (not illustrated) that provides power to operate the drive mechanism 270 during operation of the chaff dispensing system 10. The drive mechanism 270 is electrically connected to the power source located on the pylon of the plurality of pylons 12. In this illustrated embodiment, the drive mechanism 270 is configured to complement the lead screw 266 of the plunging piston 260 in order to rotate and transition the plunging piston 260 from a first position to a second position within the chamber 252. Such rotation caused by the drive mechanism 270 upon the lead screw 266 of the plunging piston 260 is shown by arrow 271. Upon rotation, the plunging piston 260 transitions from the first end 242 of the dispenser 240 to the second end 244 of the dispenser 240 to eject the metered volume of chaff material 290 outside of the dispenser 240 via the head 268.

While the chaff dispensing system 200 includes the plunging piston 260 configured to the drive mechanism 270 to eject a metered volume of chaff material 290 through an electro-mechanical drive system, any suitable mechanism and/or system may be used to eject a metered volume of chaff material. In one exemplary embodiment, a chaff dispensing system may include a pneumatic device, such as the pneumatic piston 232, that is configured to eject a metered volume of chaff material from a chaff dispensing system. In another exemplary embodiment, a chaff dispensing system may include a hydraulic device, such as a hydraulic piston, that is configured to eject a metered volume of chaff material from a chaff dispensing system.

Having now described the components in the chaff dispensing system 200, a method of use for the chaff dispensing system 200 is described in detail below.

Prior to installing the container 210 onto the aircraft 10, the container 210 is filled with a volume of chaff material 290. The volume of chaff material 290 included in the container 210 may be of any suitable volume for a particular embodiment of the chaff dispensing system 200, including the type of mission that will be performed by the aircraft 10. Once the container 210 is filled with a volume of chaff material 290 and is sealed, the container 210 may be loaded onto the aircraft 10 at a location that includes the dispensing assembly 230 (e.g. onto a pylon of the plurality of pylons 12, underneath a wing of the aircraft, on a fuselage mounting point, etc.). Upon loading, the connecting member 234 is connected to the ejection port 218 of the container 210 such that the container 210 is fluidly connected to the dispensing assembly 230. Once the container 210 is provided on the aircraft 10 and is in communication with the dispensing assembly 230, the chaff dispensing system 200 is ready for operation during flight and wartime of the aircraft 10.

During flight and wartime of the aircraft 10, the on-board EW system or CMDS of the aircraft 10 may initiate the chaff dispensing system 200, either manually or autonomously. Such initiation of the chaff dispensing system 200 by the on-board EW system or CMDS is operated through the controller 280 to dispense and eject a metered volume of chaff material 290 from the chaff dispensing system 200. Upon initiation of the chaff dispensing system 200, the controller 280 sends a first signal to the pressure source 231 to exert a first pressure force at the first end 212 of the container 210 to move the volume of chaff material 290 from the chamber 220 towards the ejection port 218. The first signal sent by the controller 280 may be continuously relayed to the pressure source 231 to continuously exert the first pressure force against the volume of chaff material 290. Such continual exertion of pressure on the volume of chaff material 290 provides immediate access of chaff material 290 for the dispenser 240. During the exertion of pressure by the pressure source 231, the volume of chaff material 290 is then ejected from the chamber 220 at the ejection port 218 of the container 210 and transitions through the connecting member 234 towards the dispenser 240.

As the volume of chaff material 290 transitions through the connecting member 234, the volume of chaff material 290 is maintained in the connecting member 234 adjacent to the regulating valve 236 due to the regulating valve 236 being defined in its closed state. The closed state of the regulating valve 236 is controlled by the controller 280 due to the regulating valve 236 being operably connected to the controller 280. Once the on-board EW system determines that ejection of chaff material is necessary, the controller 280 will send a signal to the regulating valve 236 to enable the regulating valve to an open state. Such open state of the regulating valve 236 allows for the volume of chaff material 290 to pass through the regulating value 236 and into the dispenser 240. During this state, the regulating valve 236 maintains the open state through the controller 280 in which a metered volume of chaff material 290 is dispensed into the dispenser 240. Once a suitable volume of metered chaff material 290 has been dispensed into the dispenser 240, the controller 280 sends another signal to the regulating valve 236 to enable the regulating valve 236 to the closed state. Such metering of the chaff material 290 is determined by the on-board EW system on the aircraft 10, through the use of the controller 280, where the metering of the chaff material 290 is based upon certain variables and/or parameters the aircraft 10 is experiencing during wartime (e.g., deterring an incoming threat).

Once the metered volume of chaff material 290 is disposed inside of the chamber 252 of the dispenser 240, the controller 280 sends a signal to the motor to initiate the drive mechanism 270. Such initiation by the motor onto the drive mechanism 270 allows the drive mechanism 270 to contact and rotate the lead screw 266 to transition the plunging piston 260 from a first position to a second position inside of the chamber 252 of the dispenser 240. Prior to transitioning the plunging piston 260, the plunging piston 260 is disposed in the first position in which the head 268 is disposed at the first end 242 of the dispenser 240 and is interfaces with an interior surface of the circumferential wall 251. As the drive mechanism 270 actuates the plunging piston 260 by rotating the lead screw 266 and transitioning the plunging piston 260 from the first position to the second position, the head 268 progresses away from the first end 242 of the dispenser 240 and towards the second end 244 of the dispenser 244. During the transition of the plunging piston 260 through the chamber 252, the head 268 directly contacts the metered volume of chaff material 290 and moves the metered volume of chaff material 290 towards the ejection nozzle 250 of the dispenser 240. The head 268 prevents any material from escaping around the head 268 during the movement of the metered volume of chaff material 290 due to the configuration of the diameters 254, 269 of the head 268 and the dispenser 240. The plunging piston 260 reaches its second position when the head 268 is disposed at the second end 242 of the dispenser 240 and directly contacts an interior surface at the second end 242 of the dispenser 240. In the second position, the metered volume of chaff material 290 has been ejected from the dispenser 240 behind the trailing edge of the pylon 12, or to the side of the pylon 12, and behind the aircraft 10.

Furthermore, the ON and OFF states of each of the pressure source 231 and drive mechanism 270 and the open and closed states of the regulating valve 236 that is enabled by the controller 280 may be repeated until the container 210 is empty and no longer contains a volume of chaff material 290. As such, the controller 280 may send signals to the pressure source 231, the regulating valve 236, and the drive mechanism 270 to eject and dispense different metered volumes of chaff material 290 upon the parameters the aircraft 10 is experiencing during wartime. For example, first and second metered volumes of chaff material 290 may be ejected and dispensed from the chaff dispensing system 200 at different times based on the determination from the on-board EW system. In this example, the first and second metered volumes of chaff material 290 may be equal or different in volumes based on the parameters determined by the on-board EW system (e.g., deterring and diverting an incoming threat).

The chaff dispensing system 200 is considered advantageous at least because the chaff dispensing system 200 is able to variably, continuously, and discretely dispense and eject volumes of chaff material 290 based on warnings detected by the on-board EW system. The dispensing assembly 230, via the pressure source 231, is able to continuously or variably exert a force onto the volume of chaff material 290 directed to the regulating valve 236 to provide the regulating valve 236 with an immediate volume of chaff material 290. Additionally, the regulating valve 236 may continuously, variably, or discretely eject a metered amount of chaff material 290 from the chaff dispensing system 200 based on the determinations made by the on-board EW system. In one exemplary embodiment, the regulating valve 236 may eject a first volume of chaff material at a first time based on an incoming threat detected by the on-board EW system and then a second volume of chaff material at a second time based on the same or another incoming threat detected by the on-board EW system. Here, the first volume of chaff material may be greater, less than, or equal to the second volume of chaff material ejected by the chaff dispensing system 200.

Figure 3C:
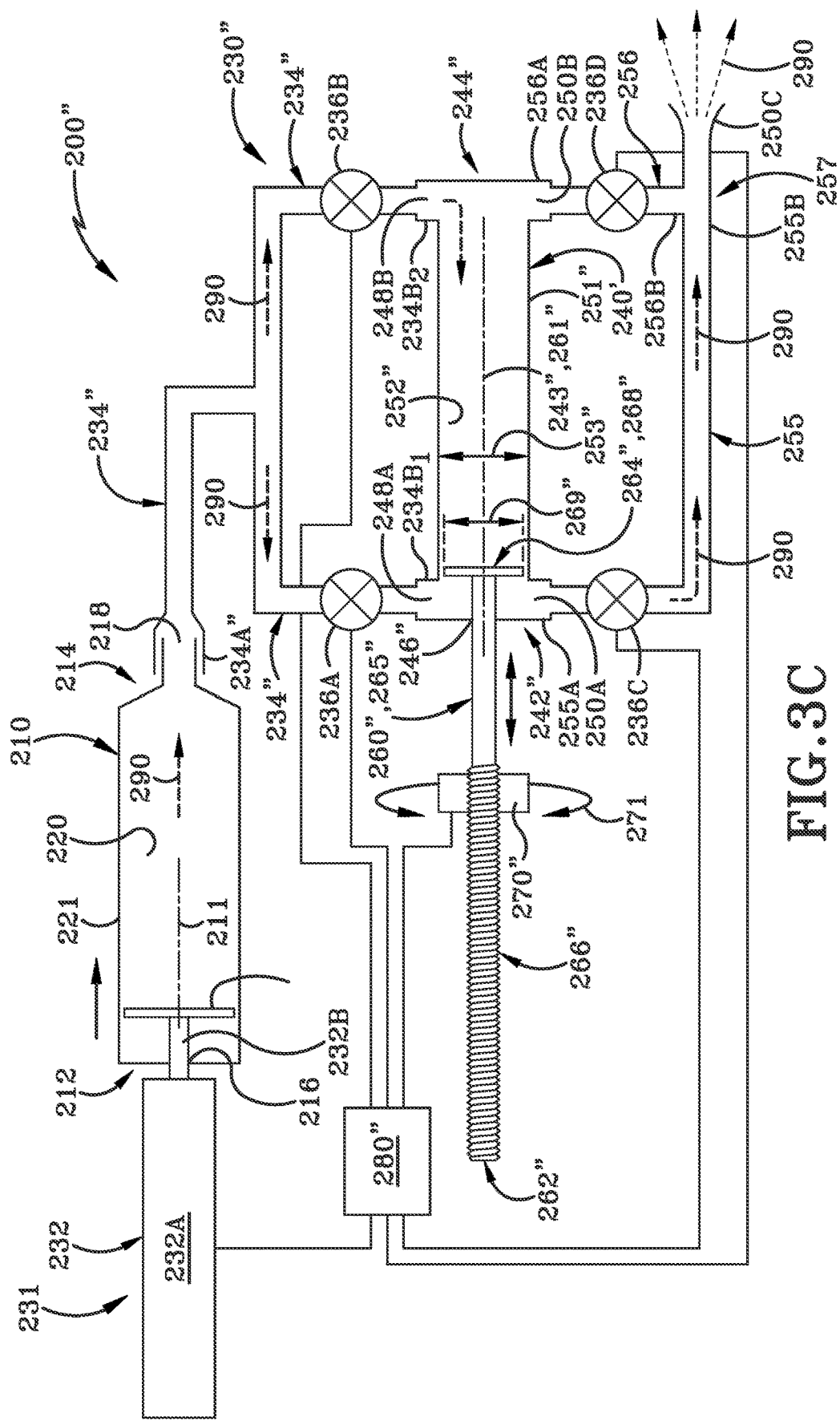
FIG. 3C is a schematic view of an alternative chaff dispensing system similar to the chaff dispensing system illustrated in FIG. 3A.

FIG. 3C illustrates another alternative chaff dispensing system 200". The chaff dispensing system 200" is similar to the chaff dispensing system 200 illustrated in FIG. 3A, expect as detailed below. The chaff dispensing system 200" includes an alternative dispensing assembly 230" that includes a first connecting member 234", a first regulatory valve 236A, a second regulatory valve 236B, a third regulatory valve 236C, a fourth regulatory valve 236D, a dispenser 240", a second connecting member 255, a third connecting member 256, a plunging piston 260", a drive mechanism 270", and a controller 280".

In the illustrated embodiment, the first connecting member 234" includes a first end 234A" that connects to the ejection port 218 of the container 210, which is similar to the connecting member 234 in the chaff dispensing system 200. However, the first connecting member 234" bifurcates at a central portion of the first connecting member 234" where the first connecting member 234" defines a second end 234B$_1$ and a third end 234B$_2$ that connect to dispenser 240" at different locations. Such locations are described in more detail below. The first connecting member 234" also defines a passageway (not illustrated) that is disposed between the first end 234A" and the second end 234B$_1$ and is disposed between the first end 234A" and the third end 234B$_2$. The passageway provides communication between the first end 234A" and the second end 234B$_1$ and between the first end 234A" and the third end 234B$_2$ in the first connecting member 234". In addition, the first connecting member 234" provides fluid communication between the container 210 and the dispensing assembly 230" to move the volume of chaff material 290 from the container 210 to the dispenser 240".

The first regulating valve 236A is disposed along the first connecting member 234" between the first end 234A" and the second end 234B$_1$ of the first connecting member 234". The second regulating valve 236B is disposed along the first connecting member 234" between the first end 234A" and the third end 234B$_2$ of the first connecting member 234". The first and second regulating valves 236A, 236B are electrically connected to the controller 280" in the chaff dispensing system 200". In this illustrated embodiment, each of the first and second regulating valves 236A, 236B has an open state and a closed state that may be controlled by the controller 280" through an on-board electronic warfare (EW) system located in the aircraft 10. In the closed state, the first regulating valve 236A prevents any volume of chaff material 290 to progress towards the second end 234B$_1$ of the first connecting member 234". Similarly, the second regulating valve 236B prevents any volume of chaff material 290 to progress towards the third end 234B$_2$ of the first connecting member 234". In the open state, the first regulating valve 236A provides the capability of measuring and/or metering a measured volume of chaff material 290 to the dispenser 240 at the second end 234B$_1$ of the first connecting member 234". In the open state, the second regulating valve 236B provides the capability of measuring and/or metering a measured volume of chaff material 290 to the dispenser at the third end 234B$_2$ of the first connecting member 234". Such metered volumes of chaff material 290 may vary and may be determined by the controller 280" during use of the chaff dispensing system 200". Once the metered volume of chaff material 290 is determined suitable by the controller 280" for either the first or second regulating valves 236A, 236B, each of the first or second regulating valves 236A, 2363 is in the closed state to prevent any volume of chaff material 290 from progressing towards the second end 234B$_1$ or the third end 234B$_2$ of the first connecting member 234".

During use, each of the first and second regulating valves 236A, 236B may define any state determined by the controller 280" during the operation of the chaff dispensing system 200" in wartime. In one exemplary embodiment, the controller 280" may enable the first regulating valve 236A to the open state to allow a metered volume of chaff material 290 to progress towards the second end 234B of the first connecting member 234" and into the dispenser 240", and the controller 280 may enable the second regulating valve 236B to the closed state to prevent any volume of chaff material to progress towards the third end 234B$_2$ of the first connecting member 234" and into the dispenser 240". In another exemplary embodiment, the controller 280" may enable the first regulating valve 236A to the closed state to prevent any volume of chaff material 290 to progress towards the second end 234B of the first connecting member 234" and into the dispenser 240", and the controller 280" may enable the second regulating valve 236B to the open state to allow a metered volume of chaff material 290 to progress towards the third end 234B$_2$ of the first connecting member 234" and into the dispenser 240". In another exemplary embodiment, the controller 280" may enable both the first and second regulating valves 236A, 236B to the open state to allow a first metered volume of chaff material 290 to progress towards the second end 234B of the first connecting member 234" and a second metered volume of chaff material 290 to progress towards the third end 234B132 of the first connecting member 234". In another exemplary embodiment, the controller 280" may enable both the first and second regulating valves 236A, 2363 to the closed state to prevent any volume of chaff material 290 to progress towards the second end 234B$_1$ of the first connecting member 234" or to progress towards the third end 234B$_2$ of the first connecting member 234".

The dispenser 240" includes a first end 242", a second end 244" disposed directly opposite to the first end 242", and a longitudinal axis 243" that extends between the first and second ends 242", 244" of the dispenser 240". The dispenser 240" includes a first inlet opening 246" disposed at the first end 242 of the dispenser 240. The dispenser 240" also includes a second inlet opening 248A disposed at the first end 242" of the dispenser 240" that is sized and configured to operably engage the second end 234B$_1$ of the first connecting member 234". The dispenser also includes a third inlet opening 248B disposed at the second end 244" of the dispenser 240" that is sized and configured to operably engage the third end 234B$_2$ of the first connecting member 234". Such engagement between the dispenser 240" and the first connecting member 234 provides fluid communication between the container 210" and the dispenser 240" such that that ejection port 218 of the container 210 is in fluid communication with the second and third inlet openings 248A, 248B of the dispenser 240". The dispenser 240" also includes a first ejection opening 250A that is disposed at the first end 242" of the dispenser 240" and is sized and configured to operably engage the second connecting member 255. The dispenser 240 also includes a second ejection portion 2503 that is disposed at the second end 244" of the dispenser and is sized and configured to operably engage the third connecting member 256. The dispenser 240" also includes a chamber 252" that is defined by a circumferential wall 251". The chamber 252" is disposed between each of the first inlet opening 246", the second inlet opening 248A, the third inlet opening 248B, the first ejection opening 250A, and the second ejection opening 250B to house the metered volume of chaff material 290. The chamber 252" also defines a first diameter 254" that is constant between the first end 242" of the dispenser 240" to the second end 244" of the dispenser 240".

The second connecting member 255 defines a first end 255A that operably engages the first ejection opening 250A of the dispenser 240" and a second opposing end 255B. The third connecting member 256 defines a first end 256A that operably engages the second ejection opening 250B of the dispenser 240 and a second opposing end 256B. The second end 255B of the second connecting member 255 joins the second end 256B of the third connecting member 256 at a location 257 in which the second connecting member 255 is in fluid communication with the third connecting member 256. The second and third connecting members 255, 256 may be joined via a connecting component and/or device, such as a standard T-connector. The connection between the second ends 255B, 256B of the second and third connecting members 255, 256 provides fluid communication to an ejection nozzle 250C for ejecting metered volumes of chaff material 290 from the dispenser 240". The ejection nozzle 250C is sized and configured to dispense metered volumes of chaff material 290 upon initiation of the chaff dispensing system 200, which is also described in more detail below.

The third regulating valve 236C is disposed along the second connecting member 255 between the first end 255A and the second end 255B of the second connecting member 255. The fourth regulating valve 236D is disposed along the third connecting member 256 between the first end 256A and the second end 256B of the third connecting member 256. The third and fourth regulating valves 236C, 236D are electrically connected to the controller 280" in the chaff dispensing system 200". In this illustrated embodiment, each of the third and fourth regulating valves 236C, 236D has an open state and a closed state that is controlled by the controller 280" through an on-board electronic warfare (EW) system located in the aircraft 10. In the closed state, the third regulating valve 236C prevents any volume of chaff material 290 to progress towards the second end 255B of the second connecting member 255. Similarly, the fourth regulating valve 236D prevents any volume of chaff material 290 to progress towards the second end 256B of the third connecting member 256. In the open state, the third regulating valve 236C provides the capability of measuring and/or metering a measured volume of chaff material 290 to the ejection nozzle 250C. In the open state, the fourth regulating valve 236D provides the capability of measuring and/or metering a measured volume of chaff material 290 to the ejection nozzle 250C. Such metered volumes of chaff material 290 may vary and may be determined by the controller 280" during use of the chaff dispensing system 200". Once the metered volume of chaff material 290 is determined suitable by the controller 280" for either the third or fourth regulating valves 236C, 236D, each of the third or fourth regulating valves 236C, 236D is in the closed state to prevent any volume of chaff material 290 from progressing towards the ejection nozzle 250C. In one exemplary embodiment, the chaff dispensing system 200" may omit the third and fourth regulating valves 236C, 236D for use of measuring and/or metering the volume of chaff material 290 and solely rely on the first and second regulatory valves 236A, 236B.

During use, each of the third and fourth regulating valves 236C, 236D may define any state determined by the controller 280" during the operation of the chaff dispensing system 200" in wartime. In one exemplary embodiment, the controller 280" may enable the third regulating valve 236C to the open state to allow a metered volume of chaff material 290 to progress towards the second end 255B of the second connecting member 255 and towards the ejection nozzle 250C, and the controller 280" may enable the fourth regulating valve 236D to the closed state to prevent any volume of chaff material 290 to progress towards the second end 256B of the third connecting member 256 and towards the ejection nozzle 250O. In another exemplary embodiment, the controller 280" may enable the third regulating valve 236C to the closed state to prevent any volume of chaff material 290 to progress towards the second end 255B of the second connecting member 255 and towards the ejection nozzle 250C, and the controller 280" may enable the fourth regulating valve 236D to the open state to allow a metered volume of chaff material 290 to progress towards the second end 256B of the third connecting member 256 and towards the ejection nozzle 250C. In another exemplary embodiment, the controller 280" may enable both the third and fourth regulating valves 236C, 236D to the open state to allow a first metered volume of chaff material 290 to progress towards the second end 2553 of the second connecting member 255 and a second metered volume of chaff material 290 to progress towards the second end 2563 of the third connecting member 256. In another exemplary embodiment, the controller 280" may enable both the third and fourth regulating valves 236C, 236D to the closed state to prevent any volume of chaff material to progress towards the second end 255B of the second connecting member 255 or to progress towards the second end 256B of the third connecting member 256.

While the first, second, third, and fourth regulatory valves 236A, 236B, 236C, 236D are controlled via the controller 280" during each of their open and closed states, the first, second, third, and fourth regulatory valves 236A, 236B, 236C, 236D may controlled or be independent of external control in any suitable manner. In one exemplary embodiment, first, second, third, and fourth regulatory valves may be one-way check valves that are independent of external control between open and closed states. Examples of one-way check valves that may be used for first, second, third, and fourth regulatory valves include ball check valves, diaphragm check valves, swing check valves, stop-check valves, lift-check valves, in-line check valves, duckbill check valves, and other suitable one-way check valves for first, second, third, and fourth regulatory valves.

The plunging piston 260" defines a first end 262", a second end 264" this disposed directly opposite to the first end 262", a longitudinal axis 261" that extends between the first and second ends 262", 264" of the plunger piston 260", and a shaft 265" that is defined between the first and second ends 262", 264" of the plunging piston 260". The plunging piston 260" includes a lead screw 266" that is disposed circumferentially about the shaft 265". The lead screw 266" is defined from the first end 262 of the plunging piston 260" and extends towards the second end 264" of the plunging piston 260" to a location between the first and second ends 262", 264". Furthermore, the plunging piston 260" is movably attached to the first inlet opening 246" of the dispense 240" to allow the plunging piston 260" to move from a first position to a second position, which is described in more details below.

The plunging piston 260" also includes a head 268" that is disposed on the shaft 265" at the second end 264" of the plunging piston 260". The head 268" of the plunging piston 260" also defines a second diameter 269" that is substantially equal to the first diameter 253" of the chamber 252" defined by the circumferential wall 251", The configuration of head 268" and the chamber 252" allows the head 268" to transition from the first end 242" of the dispenser 240" towards the second end 244" of the dispenser 240" to dispense a metered volume of chaff material 290 through the second ejection portion 250B. The configuration of the head 268" also prevents the metered volume of chaff material 290" to progress past the head 268", towards the first end 242" of the dispenser 240", and being maintained in the chamber 252", In addition, the head 268" may transition in the opposite direction in which the head 268" transitions from the second end 244" of the dispenser 240" towards the first end 242" of the dispenser 240" to dispense another metered volume of chaff material 290 through first ejection portion 250A. While FIG. 3C illustrates a gap between the head 268" and the circumferential wall 251" of the dispenser 240", the gap is only used for illustrative purposes to clearly illustrate the head 268" being disposed within the chamber 252" of the dispenser 240". It will be understood that the gap illustrated in FIG. 3C is used for clarity only and does not limit the configuration of the head 268" and the dispenser 240" in the presented embodiment.

Furthermore, the dispenser 240" includes a drive mechanism 270". The drive mechanism 270" is mechanically linked to a motor (not illustrated) that provides power to operate the drive mechanism 270" during operation of the chaff dispensing system 200". The drive mechanism 270" is electrically connected to the power source located on the pylon of the plurality of pylons 12. In this illustrated embodiment, the drive mechanism 270" is configured to complement the lead screw 266" of the plunging piston 260" in order to rotate and transition the plunging piston 260" from a first position to a second position within the chamber 252". The drive mechanism 270" is also configured to rotate and transition the plunging piston 260" from the second position to the first position within the chamber 252". Such rotation caused by the drive mechanism 270" upon the lead screw 266" of the plunging piston 260" is shown by arrow 271. Upon a first rotation, the plunging piston 260" transitions from the first end 242" of the dispenser 240" to the second end 244" of the dispenser 240" to dispense the metered volume of chaff material 290" to the second ejection opening 250B and outside of the dispenser 240" via the head 268". Upon a second rotation, the plunging piston 260" transitions from the second end 244" of the dispenser 240" to the second end 244" of the dispenser 240" to dispense the metered volume of chaff material 290" to the first ejection opening 250A and outside of the dispenser 240" via the head 268".

Having now described the components in the chaff dispensing system 200", a method of use for the chaff dispensing system 200 is described in detail below. The container 210 of the chaff dispensing system 200" may be provided on the aircraft 10 similar to the containers 210, 210' in the chaff dispensing systems 200, 200'.

During flight and wartime of the aircraft 10, the on-board EW system or CMDS of the aircraft 10 may initiate the chaff dispensing system 200", either manually or autonomously. Such initiation of the chaff dispensing system 200" by the on-board EW system or CMDS is operated through the controller 280" to dispense and eject a metered volume of chaff material 290 from the chaff dispensing system 200". Upon initiation of the chaff dispensing system 200", the controller 280" sends a first signal to the pressure source 231 to exert a first pressure force at the first end 212 of the container 210 to move the volume of chaff material 290 from the chamber 220 towards the ejection port 218. The first signal sent by the controller 280" may be continuously relayed to the pressure source 231 to continuously exert the first pressure force against the volume of chaff material 290. Such continual exertion of pressure on the volume of chaff material 290 provides immediate access of chaff material 290 for the dispenser 240". During the exertion of pressure by the pressure source 231, the volume of chaff material 290 is then ejected from the chamber 220 at the ejection port 218 of the container 210 and transitions through the first connecting member 234" towards the dispenser 240".

As the volume of chaff material 290 transitions through the first connecting member 234", the volume of chaff material 290 is maintained in the first connecting member 234" adjacent to the first and second regulating valves 236A, 236E due to the first and second regulating valves 236A, 236B being defined in the closed state. The closed states of the first and second regulating valves 236A, 2363 are controlled by the controller 280" due to the first and second regulating valves 236A, 236B being operably connected to the controller 280". Once the on-board EW system determines that ejection of chaff material is necessary, the controller 280" will send a signal to the first regulating valve 236A to enable the first regulating valve 236A to an open state. Such open state of the first regulating valve 236A allows for the volume of chaff material 290 to pass through the first regulating value 236A and into the dispenser 240". During this state, the first regulating valve 236A maintains the open state through the controller 280" in which a metered volume of chaff material 290 is dispensed into the dispenser 240". Once a suitable volume of metered chaff material 290 has been dispensed into the dispenser 240", the controller 280" sends another signal to the first regulating valve 236A to enable the first regulating valve 236A to the closed state. Such metering of the volume of chaff material 290 is determined by the on-board EW system on the aircraft 10, through the use of the controller 280", where the metering of the chaff material 290 is based upon certain variables and/or parameters the aircraft 10 is experiencing during wartime (e.g., deterring an incoming threat).

Once the metered volume of chaff material 290 is disposed inside of the chamber 252" of the dispenser 240", the controller 280" sends a signal to the motor to initiate the drive mechanism 270". Such initiation by the motor onto the drive mechanism 270" allows the drive mechanism 270" to contact and rotate the lead screw 266" to transition the plunging piston 260" from a first position to a second position inside of the chamber 252" of the dispenser 240". Prior to transitioning the plunging piston 260", the plunging piston 260" is disposed in the first position in which the head 268" is disposed near the first end 242" of the dispenser 240" and adjacent to the first ejection opening 250A. As the drive mechanism 270" actuates the plunging piston 260" by rotating the lead screw 266" and transitioning the plunging piston 260" from the first position to the second position, the head 268" progresses away from the first end 242" of the dispenser 240" and towards the second end 244" of the dispenser 240" to the second ejection opening 250B. During the transition of the plunging piston 260" through the chamber 252", the head 268" directly contacts the metered volume of chaff material 290 and moves the metered volume of chaff material 290 towards the second ejection opening 250B of the dispenser 240", The head 268" prevents any, material from escaping around the head 268" during the movement of the metered volume of chaff material 290 due to the configuration of the diameters 254", 269" of the head 268" and the dispenser 240". The plunging piston 260" reaches its second position when the head 268" is disposed proximate to the second end 242" of the dispenser 240" and adjacent to the second ejection opening 250B of the dispenser 240". In the second position, the metered volume of chaff material 290 has been ejected from the dispenser 240", into the third connecting member 256, and towards the fourth regulatory valve 236D.

Once the on-board EW system determines that ejection of chaff material is necessary, the controller 280" will send a signal to the fourth regulating valves 236D to enable the fourth regulating valves 236D to an open state. Such open state of the fourth regulating valves 236D allows for the metered volume of chaff material 290 to pass through the fourth regulating valves 236D, towards the second end 256B of the third connecting member 256, and towards the ejection nozzle 250C. During this state, the fourth regulating valves 236D maintains the open state through the controller 280" in which the metered volume of chaff material is dispensed to the ejection nozzle 250C. Once the volume of metered chaff material 290 has been dispensed into the dispenser 240", the controller 280" sends another signal to the fourth regulating valves 236D to enable the fourth regulating valves 236D to the closed state. As such, the metered volume of chaff material 290 travels through the ejection nozzle 250C and ejects behind, or to the side of, the aircraft 10.

In addition, the ON and OFF states of each of the pressure source 231 and drive mechanism 270" and the open and closed states of the second and fourth regulating valves 236B, 236D that is enabled by the controller 280" may be repeated until the container 210 is empty and no longer contains a volume of chaff material 290. As such, the controller 280" may send signals to the pressure source 231, the second and fourth regulating valves 236B, 236D, and the drive mechanism 270" to eject and dispense different metered volumes of chaff material 290 upon the parameters the aircraft 10 is experiencing during wartime. For example, first and second metered volumes of chaff material 290 may be ejected and dispensed from the chaff dispensing system 200 at different times based on the determination from the on-board EW system. In this example, the first and second metered volumes of chaff material 290 may be equal or different in volumes based on the parameters determined by the on-board EW system (e.g., deterring and diverting an incoming threat).

In addition, the open and closed states of the first and third regulating valves 236A, 236C that is enabled by the controller 280" may be used and repeated until the container 210 is empty and no longer contains a volume of chaff material 290. As such, the controller 280" may send signals to the first and third regulatory valves 236A, 236C, similar to the signals sent to the second and fourth regulatory valves 2368, 236D as stated above, to eject and dispense different metered volumes of chaff material 290 upon the parameters the aircraft 10 is experiencing during wartime. For example, first and second metered volumes of chaff material 290 may be ejected and dispensed from the chaff dispensing system 200 at different times based on the determination from the on-board EW system. In this example, the first and second metered volumes of chaff material 290 may be equal or different in volumes based on the parameters determined by the on-board EW system (e.g.; deterring and diverting an incoming threat).

Furthermore, the controller 280" may simultaneously use each of the first, second, third, and fourth regulatory valves 236A, 236B, 236C, 236D during operation of the chaff dispensing system 200". Such simultaneous use of each of the first, second, third, and fourth regulatory valves 236A, 236B, 236C, 236D is considered advantageous at least because the chaff dispensing system 200" is able to variably, continuously, and discretely dispense and eject volumes of chaff material 290 based on warnings detected by the on-board EW system. In one exemplary embodiment, the regulating valve 236 may eject a first volume of chaff material at a first time based on an incoming threat detected by the on-board EW system and then a second volume of chaff material at a second time based on the same or another incoming threat detected by the on-board EW system. Here, the first volume of chaff material may be greater, less than, or equal to the second volume of chaff material ejected by the chaff dispensing system 200.

Figure 4:
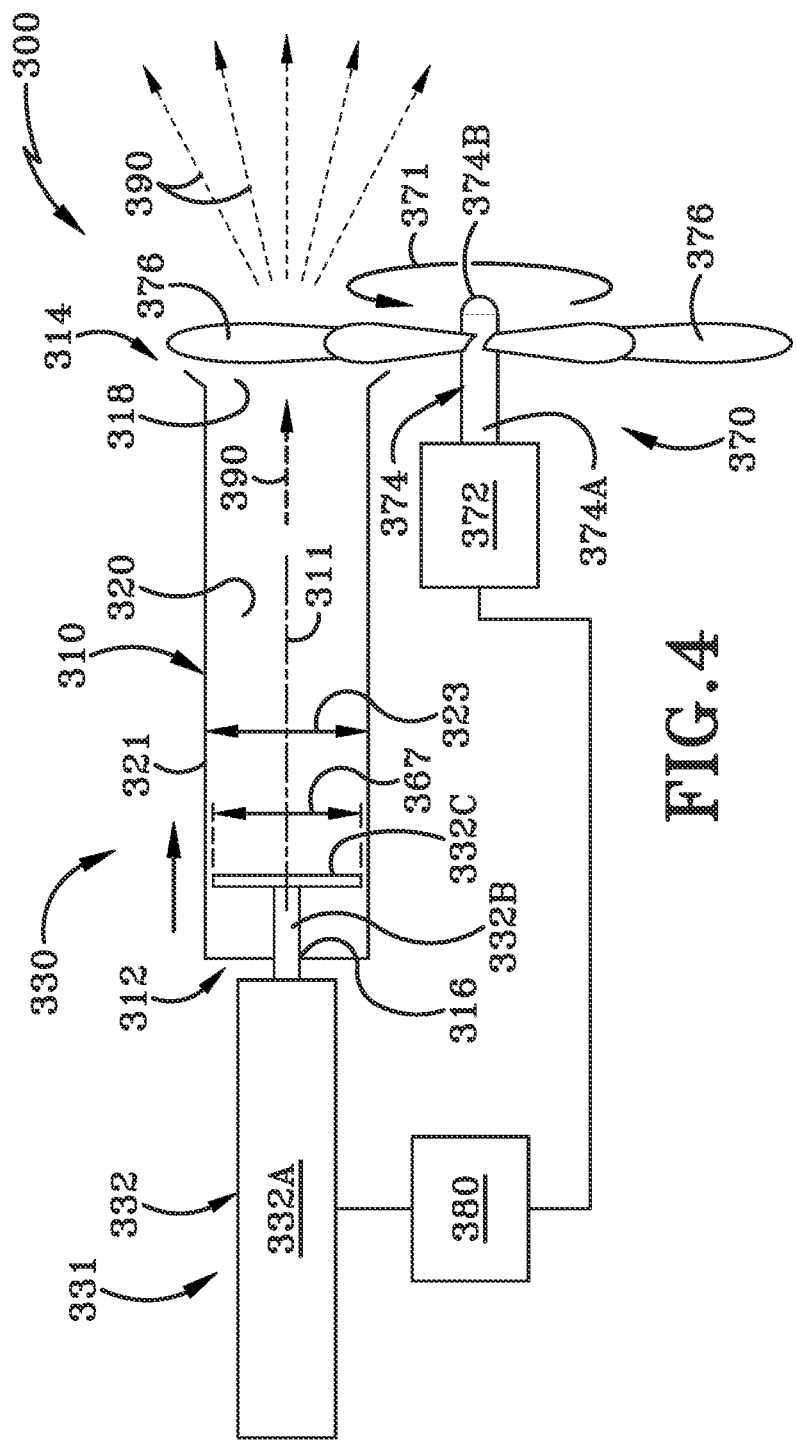
FIG. 4 is a schematic view of another chaff dispensing system.

FIG. 4 illustrates another chaff dispensing system 300. The chaff dispensing system 300 is similar to the chaff dispensing system 200 as illustrated in FIGS. 3A and 3B, except as described below. The chaff dispensing system 300 includes a container 310, a dispensing assembly 330 that includes a cutting mechanism 370, a controller 380, and a volume of chaff material 390.

The container 310 includes a first end 312, a second end 314 that directly opposes the first end 312, and a longitudinal axis 311 that extends from the first end 312 to the second end 314. The container 310 includes an inlet port 316 disposed at the first end 312 of the container 310. The container 310 also includes an ejection portion 318 at the second end 314 of the container 310. The ejection port 318 is sized and configured eject and dispense a metered volume of chaff material 390 out of the container 310. The container 310 also includes a chamber 320 defined by a circumferential wall 321. The chamber 320 extends from the inlet port 316 of the container 310 to the ejection port 318 of the container 310. The chamber 320 is sized and configured to receive and house the volume of chaff material 390. The circumferential wall 321 also defines a first diameter 323 that is constant between the first end 312 of the container 310 to the ejection port 318 of the container 310 that defines the chamber 320.

The dispensing assembly 330 includes a pressure source 331 that is connected to the inlet port 316 of the container 310. The configuration of the connection between external pressure source 331 and the container 310 provides a first pressure against the chaff material 390 at the first end 312 of the container 310 to move the chaff material 390 from the chamber 320, towards the second end 314 of the container 310, and through the ejection port 318 of the container 310 to transition the chaff material 390 outside of the container 310. The pressure source 331 may be configured and arrangement in any suitable way in the dispensing assembly 330. In one exemplary embodiment, a pressure source may be external to a dispensing assembly such that the pressure source is disposed exterior to a pod or payload that is housing a chaff dispensing system. In another exemplary embodiment, a pressure source may be internal to a dispensing assembly such that the pressure source is disposed inside a pod or payload that is housing a chaff dispensing system.

The pressure source 331 in the dispensing assembly 330 may be any suitable device or apparatus that is able to exert a first pressure against the chaff material 390 to move the volume of chaff material 390 outside of the chamber 320 of the container 310. FIG. 4 illustrates an exemplary embodiment where the first pressure exerted on the volume of chaff material 390 generated by the pressure source 331 may be a pneumatic piston 332 similar to the pneumatic piston 232 illustrated in the chaff dispensing system 200. The pneumatic piston 332 includes a pneumatic actuator 332A that exerts force onto a shaft 332B. The pneumatic piston 332 includes a head 332C disposed on the shaft 332B opposite to the pneumatic actuator 332A that is used to exert the first pressure against the volume of chaff material 390. As such, the head 332C would be moveably disposed at the inlet port 316 of the container 310 to exert a pushing pressure against the volume of chaff material 390 such the volume of chaff material 390 is ejected from the container 310. In addition, any suitable pressure source described and illustrated herein may be used for the pressure source 331, such as pressure source 231' of the chaff dispensing system 200' illustrated in FIG. 3B.

The head 332C of the plunging piston 332 also defines a second diameter 367 that is substantially equal to the first diameter 323 of the chamber 320 defined by the circumferential wall 321. The configuration of the second diameter 367 of the head 332C being substantially equal to the first diameter 323 of the chamber 320 defined by the circumferential wall 321 allows the head 332C to transition from the first end 312 of the container 310 towards the second end 314 of the container 314 while preventing any of the metered volume of chaff material 390 to progress past the head 332C and to be maintained in the chamber 320 of the container 310.

The diameter of the head 332C of the pneumatic piston 332 is substantially equal to the diameter of the circumferential wall 321 of the container 310 in which the head 332C does not contact the circumferential wall 321 of the container 310, Such configuration between the head 332C and the container 310 prevents the volume of chaff material 390 from escaping around the head 332C of the pneumatic piston 332 towards the first end 312 of the container 310, While FIG. 4 illustrates a gap between the head 332C and the circumferential wall 321 of the container 310, the gap is only used for illustrative purposes to clearly illustrate the head 332C being disposed within the chamber 320 of the container 310. It will be understood that the gap illustrated in FIG. 4 is used for clarity only and does not limit the configuration of the head 332C and the container 310 in the presented embodiment.

The container 310 is made of a rigid material. Such rigidity of the container 310 allows for a pressure source, such as external pressure source 331, of the dispensing assembly 330 to exert pressure into the container 310 to move the volume of chaff material 390 from the chamber 320 and to eject the volume of chaff material 390 through the ejection port 318, which is described in more detail below. The rigidity of the container 310 prevents any deformation or flexibility when pressure is applied by a pressure source in the chamber 320 of the container 310, which is different as compared to the container 310 in the chaff dispensing system 300, Furthermore, the material of the container 310 may be any suitable rigid material that will contain the volume of chaff material 380 for the chaff dispensing system 300.

The pressure source 331 in the dispensing assembly 330 may be of any suitable device or apparatus that is able to exert a first pressure against the chaff material 390 to transition the chaff material 390 outside of the chamber 320 of the container 310. In one exemplary embodiment, the first pressure exerted on the chaff material 390 generated by the pressure source 331 may be forced air generated by an air compressor, such as the air compressor 232B in FIG. 2B, As such, the pressure source 331 would be pneumatically connected to the inlet port 316 of the container 310 to assert the first pressure of forced air onto the chaff material 390 in the chamber 320. In another exemplary embodiment, and as illustrated in FIG. 4, the first pressure 331 exerted on the chaff material 390 generated by the pressure source 331 may be a pushing pressure by a piston ramp pneumatically connected to an air compressor. As such, the pressure source 231 would be mechanically connected to the inlet port 216 of the container 210 to assert the first pressure of pushing pressure by a piston ramp pneumatically connected to an air compressor.

While the chaff dispensing system 300 includes the pressure source 331 to eject the volume of chaff material 390 to the ejection nozzle 318 via a pneumatic system, any suitable mechanism and/or system may be used to eject a volume of chaff material to a dispenser in a chaff dispensing system. In one exemplary embodiment, a chaff dispensing system may include a hydraulic device, such as a hydraulic piston, that is configured to eject a volume of chaff material to a dispenser in a chaff dispensing system. In another exemplary embodiment, a chaff dispensing system may include an electro-mechanical drive system that is configured to eject a volume of chaff material to a dispenser in a chaff dispensing system. Such electro-mechanical drive systems may include the electro-mechanical drive systems that are described herein and other suitable electro-mechanical drive systems for this particular embodiment, which includes a ball lead screw with a stepper motor drive or a servo motor drive.

In addition, the pressure source 331 is electrically connected the controller 380 such that the controller 380 controls the operation of the pressure source 331 during wartime. In the illustrated embodiment, the pressure source 331 includes an ON state and an OFF state that is controlled by the controller 380 through an on-board EW system or CMDS located in the aircraft 10. In the OFF state, the pressure source 331 remains stationary to prevent any volume of chaff material 390 to progress through the chamber 320 of the container 310 and out the ejection port 318. In the ON state, the pressure source 331 provides the capability of measuring and/or metering a measured volume of chaff material 390 to dispense towards the ejection port 318. Such metered volumes of chaff material 390 may vary and may be determined by the controller 380 during use of the chaff dispensing system 300. Once the metered volume of chaff material 390 is determined suitable by the controller 380, the pressure source 331 is in the OFF state, via the controller 380, to prevent any volume of chaff material 390 to progress through the chamber 320 of the container 310 and out the ejection port 318.

As stated above, the dispensing assembly 330 includes the cutting mechanism 370. The cutting mechanism 370 is disposed outside of the container 310 and adjacent to the ejection port 318 of the container 310. The cutting mechanism 370 includes a motor 372, a drive shaft 374 that includes a first end 374A and a second end 374B, and a plurality of blades 376 disposed radially on the drive shaft 374 towards the second end 374B of the drive shaft 374. The first end 374A of the drive shaft 374 is operably engaged to a motor 372. Such engagement allows the motor 372 to rotate the drive shaft 374 and the plurality of blades 376 during use of the chaff dispensing system 300, which is illustrated with the arrow 371. During operation, the plurality of blades 376 rotates in a counter-clockwise direction while the metered volume of chaff material 390 is ejected from the container 310 at the ejection port 316. Upon ejection of the metered volume of chaff material 390, the plurality of blades 376 cuts and propels the metered volume of chaff material 390 away from the container 310 and the cutting mechanism 370 and behind, or to side of, the aircraft 10. Such cutting and propelling by the cutting mechanism 370 provides a greater volume of chaff material to be dispensed behind the aircraft 10 to deter and divert any incoming enemy threats away from the aircraft 10 and towards the chaff material. In one exemplary embodiment, the cutting material 370 creates a cloud or billow of chaff material behind the trailing edge of a pylon 12 on the aircraft 10 to maximize the chaff material to deter or divert any incoming enemy threats away from the aircraft 10 and towards the chaff material. Furthermore, the volume of chaff material 390 may be dispensed continuously or intermittently in constant proportions or in a variable amount per unit time during wartime. Such dispensing of the volume of chaff material is described in more detail below.

In addition, the cutting mechanism 370 is electrically connected to the controller 380 such that the controller 380 controls the operation of the cutting mechanism 370 during wartime of the chaff dispensing system 300. In the illustrated embodiment, the cutting mechanism 370 includes an ON state and an OFF state that is controlled by the controller 380 through the on-board electronic warfare (EW) system located in the aircraft 10. In the OFF state, the cutting mechanism 370 remains stationary due to the pressure source 331 not exerting a force against the volume of chaff material 390. In the ON state, the cutting mechanism 370 provides the capability of cutting and propelling the volume of chaff material 390 behind, or to the side of, the aircraft 10. Once the volume of chaff material 390 is determined suitable by the controller 380, the cutting mechanism 370 is enabled to the OFF state, via the controller 380, to prevent any rotation of the plurality of blades 376 while no volume of chaff material 390 is being ejected from the container 310.

Having now described the components in the chaff dispensing system 300, a method of use for the chaff dispensing system 300 is described in detail below.

Prior to installing the container 310 onto a pylon of the plurality of pylons 12 of the aircraft 10, the container 310 is filled with a volume of chaff material 190. The volume of chaff material 390 included in the container 310 may be of any suitable volume for a particular embodiment of the chaff dispensing system 300, including the type of mission that will be performed by the aircraft 10. Once the container 310 is filled with a volume of chaff material 390 and sealed, the container 310 may be loaded on the aircraft 10 at a location that includes the dispensing assembly 330 (e.g. onto a pylon of the plurality of pylons 12, underneath a wing of the aircraft, on a fuselage mounting point, etc.). Once the container 310 is provided on the aircraft 10 and is in communication with the dispensing assembly 330, the chaff dispensing system 300 is ready for operation.

During flight and wartime, the on-board EW system of the aircraft 10 may initiate the chaff dispensing system 300, either manually or autonomously. Such initiation of the chaff dispensing system 300 by the on-board EW system is operated through the controller 380 to dispense and eject a metered volume of chaff material 390 from the chaff dispensing system 300. Upon enablement, the controller 380 sends a first signal to the pressure source 331 to enable the pressure source 331 to an ON state. In the ON state, the pressure source 331 exerts a first pressure force at the first end 312 of the container 310 to move the volume of chaff material 390 from the chamber 320 towards the ejection port 318. The first signal sent by the controller 380 may be continuously relayed to the pressure source 331 to continuously exert the first pressure force against the volume of chaff material 390. Such continual exertion of pressure on the volume of chaff material 390 provides immediate access of chaff material 390 for the dispenser 340.

As the volume of chaff material 390 moves through the chamber 320 of the container 310, the controller 380 sends a second signal to the cutting mechanism 370 to enable the cutting mechanism 370 to an ON state. In the ON state, the cutting mechanism 370 allows for the rotation of the plurality of blades 376, via the motor 372; during the ejection of the chaff material 390. As the volume of chaff material 390 is ejected from the chamber 120 and through the ejection port 318 of the container 310, each blade of the plurality of blades 376 cuts and propels the volume of chaff material 390 behind the trailing edge of the pylon 12 and behind the aircraft 10. As stated previously, the plurality of blades 376 creates a cloud or billow of chaff material 390 behind the aircraft 10 to divert any incoming enemy threats.

As the volume of chaff material 390 moves through the chamber 320 of the container 310, the volume of chaff material 390 is metered by the on-board EW system through the controller 380. As the metered volume of chaff material 390 has been ejected, the controller 380 will then send a third signal to the pressure source 331 to enable the pressure source 331 to an OFF state. Such metering of the chaff material 390 is determined by the on-board EW system on the aircraft 10, through the use of the controller 380, where the metering of the chaff material 390 is based upon certain variables and/or parameters the aircraft 10 is experiencing during wartime (e.g., deterring and diverting an incoming threat).

Furthermore, the ON and OFF state of each of the pressure source 331 and cutting mechanism 370 that is enabled by the controller 380 may be repeated until the container 310 is empty and no longer contains a volume of chaff material 390. As such, the controller 380 may send signals to the pressure source 331 and cutting mechanism 370 to eject and propel different metered volumes of chaff material 390 upon the parameters the aircraft 10 is experiencing during wartime. For example, first and second metered volumes of chaff material 390 may be ejected and dispensed from the chaff dispensing system 300 at different times based on the determination from the on-board EW system. In this example, the first and second metered volumes of chaff material 390 may be equal or different in volumes based on the parameters determined by the on-board EW system (e.g., deterring and diverting an incoming threat).

The chaff dispensing system 300 is considered advantageous at least because the chaff dispensing system 300 is able to variably, continuously, and discretely dispense and eject volumes of chaff material 390 based on warnings detected by the on-board EW system. The dispensing assembly 330, via the pressure source 331, is able to continuously, variably, or discretely exert a force onto the volume of chaff material 390 directed to the cutting mechanism 370 to provide the cutting mechanism 370 with an immediate volume of chaff material 390. As such, the pressure source 331 may continuously, variably, or discretely eject a metered volume of chaff material 390 from the chaff dispensing system 300 based on the determinations made by the on-board EW system. In one exemplary embodiment, the pressure source 331 may eject a first volume of chaff material to cutting mechanism 370 at a first time based on an incoming threat detected by the on-board EW system and then a second volume of chaff material to cutting mechanism 370 at a second time based on the same or another incoming threat detected by the on-board EW system. Here, the first volume of chaff material may be greater, less than, or equal to the second volume of chaff material ejected by the chaff dispensing system 300.

Figure 5A:
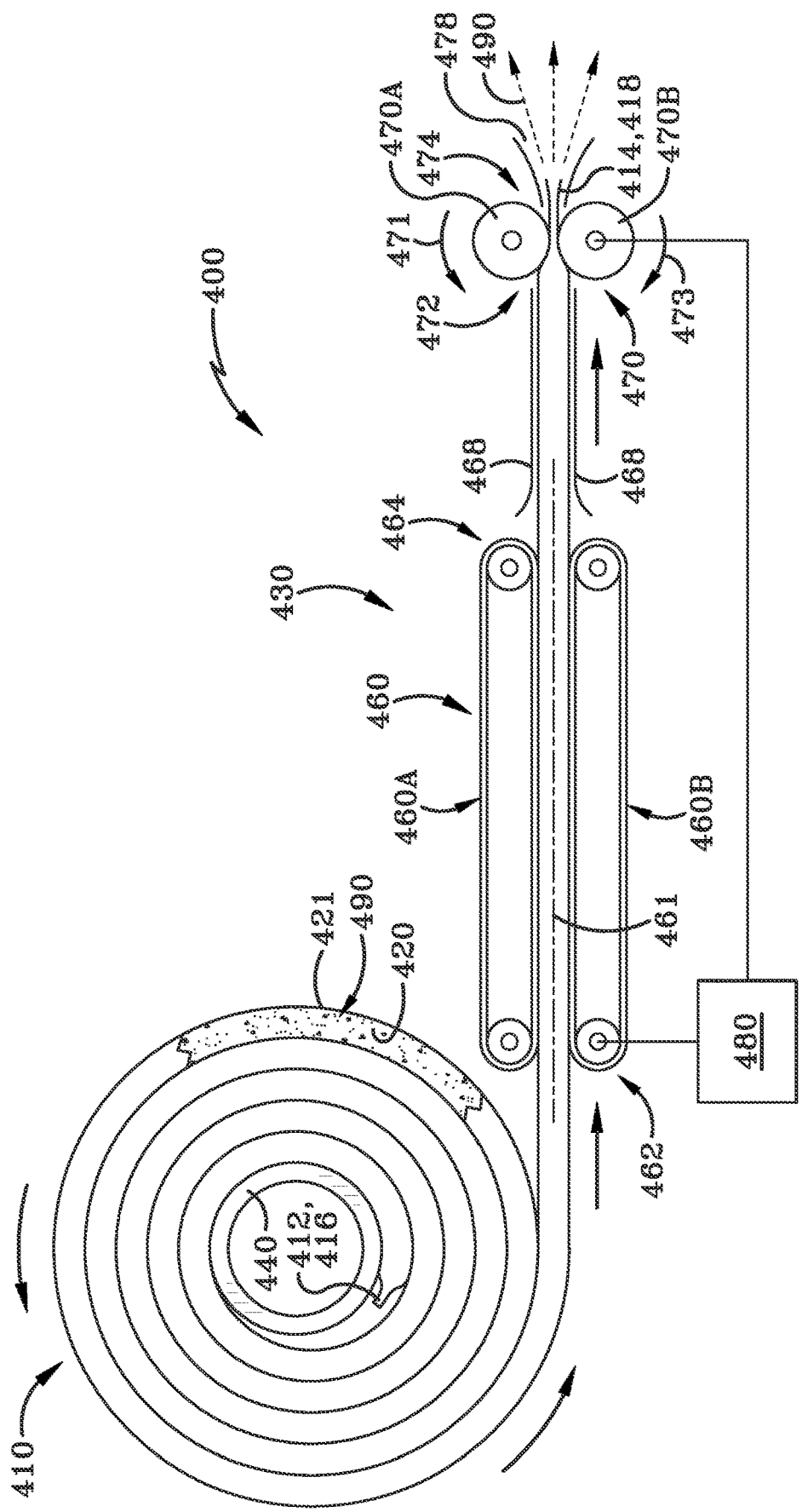
FIG. 5A is a schematic view of another chaff dispensing system.
Figure 5B:
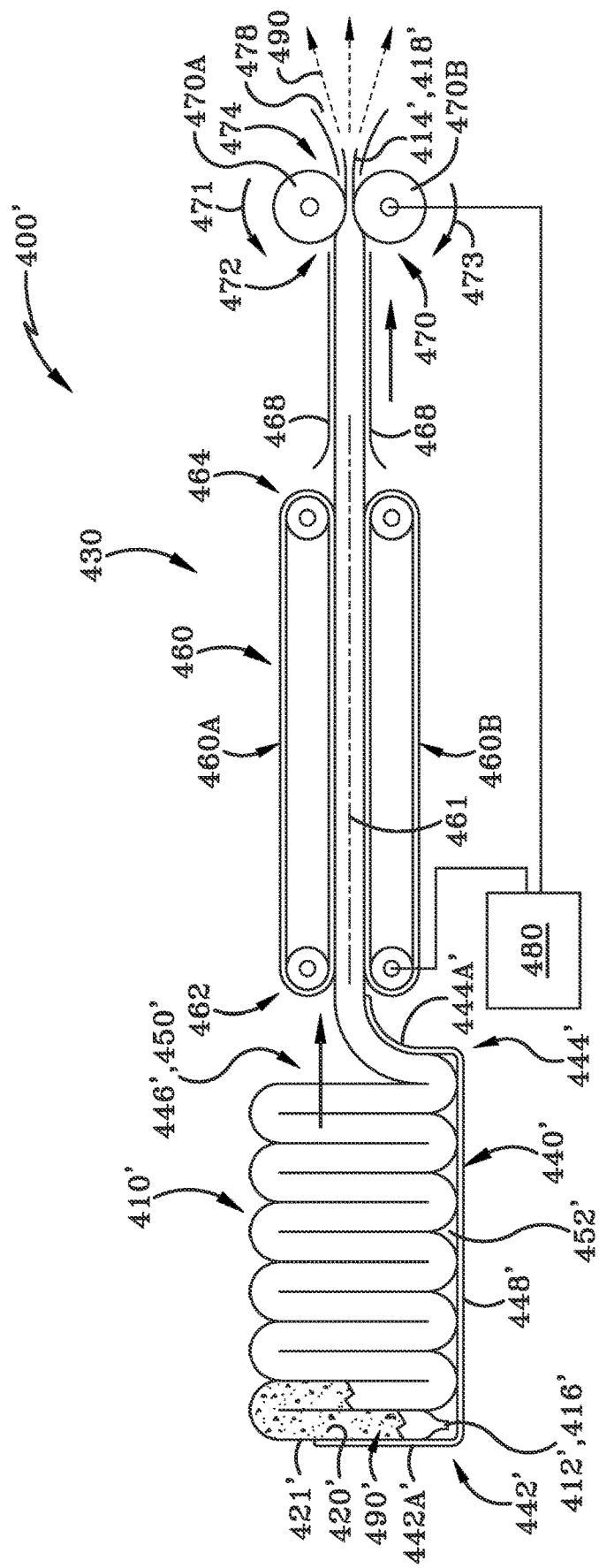
FIG. 5B is a schematic view of an alternative chaff dispensing system similar to the chaff dispensing system illustrated in FIG. 5A.

FIGS. 5A and 5B illustrate another chaff dispensing system 400. The chaff dispensing system 400 is similar to the chaff dispensing system 100 as illustrated in FIG. 1, except as described below. The chaff dispensing system 400 includes a container 410, a dispensing assembly 430 that includes a feeding mechanism 460 and a crushing mechanism 470, a controller 480, and a volume of chaff material 490.

The container 410 is similar to the configuration of the container 110 in the chaff dispensing system 100 illustrated in FIG. 1. In this illustrated embodiment, however, the container 410 is provided in a different packaging configuration to compactly store the container 410 on the aircraft 10. As illustrated in FIG. 5A, the container 410 includes a first end 412, a second opposing end 414, an inlet opening 416 defined at the first end 412, and an ejection opening 418 defined at the second end 414. The container 410 also includes a chamber 420 defined by a circumferential wall 421 between the inlet opening 416 and the ejection opening 418 that holds the volume of chaff material 490. The container 410 defines a length that is measured between the first and second ends 412, 414 of the container 410 where length of the container 410 is greater than the containers previously described herein. As such, the chamber 420 of the container 410 may hold a greater volume of the chaff material 490 than the chambers of the chambers previously described herein. In addition, the container 410 is made of a resilient material that allows the container 410 to move and rest upon itself during the packaging process of the container 410. The configuration of the container 410 is considered advantageous at least because the container 410 may be stored and/or packaged in any suitable compact configuration that reduces the overall side of the container 410 while still maintain a suitable volume of chaff material 490. In addition, the container 410 allows the feeding mechanism 460 and the crushing mechanism 470 to dispense the volume of chaff material 490 continuously or intermittently in constant proportions or in a variable amount per unit time during wartime. Such dispensing of the volume of chaff material 490 from the container 410 is described in more detail below.

The container 410 may be packaged and stored in any suitable way within the chaff dispensing system 400. In one exemplary example and as illustrated in FIG. 5A, a container may be packaged in a spirally coiled configuration about a holder to compactly hold a container within a chaff dispensing system on an aircraft. In this exemplary embodiment, a first end of a container, such as first end 412 of the container 410, may directly contact the holder, and a second end of the container, such as second end 414 of the container 410, may directly contact a feeding mechanism once the container is loaded on an aircraft. In another exemplary embodiment, a container may be packaged in a spirally or helically wrapped configuration about a holder to compactly hold the container within a chaff dispensing system on an aircraft. In yet another exemplary embodiment and as illustrated in FIG. 5B, a container may be packaged in a fanfold configuration to be compactly held inside a holder within a chaff dispensing system on an aircraft. In yet another example, a container may be packaged in a coiled-up flat hose configuration to compactly hold the container within a chaff dispensing system on an aircraft. In yet another example, a container may be packaged in an overlapping configuration to compactly hold the container within a chaff dispensing system on an aircraft. As such, any similar and suitable configuration of packaging a container may be used in the chaff dispensing system 400.

The dispensing assembly 430 includes a holder 440. As illustrated in FIG. 5A, the container 410 is held circumferentially about the holder 440 for ease of packaging and transporting. As illustrated in FIG. 5A, the holder 440 is a cylindrical tube and/or pipe that holds the container 410. The holder 440 may be mounted to a mechanism provided on the aircraft 10 that holds each end of the holder 440 to the holder 440 to rotate along an axis of rotation that is defined between each end of the holder 440. Such a configuration allows the holder 440 to easily unravel the container 410 during use of the chaff dispensing system 400. In addition, the holder 440 of the dispensing system 430 in the chaff dispensing system 400 may define any suitable shape for a chaff dispensing system, Examples of suitable shapes for a holder in a chaff dispensing system includes circular, tubular, cylindrical, cuboidal, triangular, hexagonal, octagonal, curvilinear, rounded, parallelogram, or other suitable shapes that are considered suitable for a holder in a chaff dispensing system.

FIG. 5B illustrates an alternative chaff dispensing system 400'. The chaff dispensing system 400' is similar to the chaff dispensing system 400, except the chaff dispensing system 400' includes an alternative holder 440'. The container 410' is similar to the configuration of the container 410 in the chaff dispensing system 400. However, the container 410' is provided in a fanfold configuration and disposed within the holder 440'. In this illustrated embodiment, the container 410' is continuously from the first end 412' and inlet end 416' of the container 410' to the second end 414' and the ejection end 418' of the container 410'. The container 410' also includes a chamber 420' defined by a circumferential wall 421' that extends between the inlet opening 416' and the ejection opening 418' that holds the volume of chaff material 490'. The container 410' is similar to the container 410 in that the container 410' also defines a length that is measured between the first and second ends 412', 414' of the container 410' where length of the container 410' is greater than the containers previously described herein. As such, the chamber 420' of the container 410' may hold a greater volume of the chaff material 490' than the chambers of the chambers previously described herein. In addition, the container 410' is made of a resilient material that allows the container 410' to move and rest upon itself during the packaging process of the container 410'. The configuration of the container 410' is considered advantageous at least because the container 410' may be stored and/or packaged in any suitable compact configuration that reduces the overall side of the container 410' while still maintain a suitable volume of chaff material 490', In addition, the container 410' allows the feeding mechanism 460' and the crushing mechanism 470' to dispense the volume of chaff material 490' continuously or intermittently in constant proportions or in a variable amount per unit time during wartime. Such dispensing of the volume of chaff material 490' from the container 410' is described in more detail below.

The holder 440' includes a first end 442' that define a first lateral wall 442A', a second end 444' that opposes the first end 442' and defines a second lateral wall 444A' and an ejection opening 446', a base wall 448' that extends from the first lateral wall 442A' to the second lateral wall 444A', an inlet opening 450', and a cavity 452'. The first lateral wall 442A' directly interfaces with and contacts the container 410' to hold the container 410' within the holder 440' where the first end 412' and the inlet opening 416' of the container 410' is defined near the first lateral wall 442A' and the base wall 448'. The base wall 448' directly interfaces with and contacts the container 410' to hold the container 410' within the holder 440'. The second lateral wall 444A' directly interfaces with and contacts the container 410' such that the container 410' is sufficiently fed and ejected from the ejection opening 446' and into the feeding mechanism 460. The second wall 444A' also defines a curvilinear shape that extends away from the second end 444' of the holder 440' to provide an ease of feeding the container 410' into the feeding mechanism 460. The inlet opening 450' is disposed directly opposite to the base wall 448' and disposed between the first and second lateral walls 442A', 444A'. The inlet opening 450' allows a user to load the container 410' into the holder 440' prior to flight of the aircraft 10. Furthermore, the first lateral wall 442A', the second lateral wall 444A', and the base wall 448' collectively define the cavity 452' that is sized and configured to receive and house the container 410' upon loading. In addition, a holder, such as holder 440', may be sized and configured to house and feed a container, such as container 410', based on the packaging configuration of said the container 410'. For example, a holder, such as holder 440, may be sized and configured to house and feed the container 410 as illustrated in FIG. 5A.

The feeding mechanism 460 includes a first end 462, a second end 464 that directly opposes the first end 462, and a longitudinal axis 461 that extends from the first end 462 to the second end 464. The first end 462 of the feeding mechanism 460 is disposed adjacent to the ejection opening 446 and the second lateral wall 444A of the holder 440. The second end 464 of the feeding mechanism 460 is disposed opposite to the first end 462 of the feeding mechanism 460. The feeding mechanism 460 directly contacts and interfaces with the container 410 at the second end 414 of the container 410 upon installation of the container 410 into the aircraft 10. In addition; the feeding mechanism 460 is used similarly in both the chaff dispensing system 400 or the alternative dispensing system 400' to eject the container 410, 410'.

In one exemplary embodiment, such as the embodiment in either FIGS. 5A and 5B, feeding mechanism 460 may include a first feeder 460A, a second feeder 460B that is disposed parallel to the first feeder 460A and oppose each other relative to the longitudinal axis 461. Each of the first feeder 460A and the second feeder 460B exerts a pulling, rotational force against the container 410 that is directed from first end 462 of the feeding mechanism 460, towards the longitudinal axis 461, and to the second end 464 of the feeding mechanism 460. During operation, the first and second feeders 460A, 460B rotate in opposite directions while progressing from the second end 414 of the container 410 towards the first end 412 of the container 410. In the exemplary embodiment, the first feeder 460A rotates in a clockwise direction, and the second feeder 460B rotates in the opposite, counter-clockwise direction relative to the first feeder 460A. Such difference in rotation between the first and second feeders 460A, 460B allows for the first and second feeders 460A, 460B to equally assert a force along opposing sides of the container 410. The configuration between feeder mechanism 460 and the container 410 allows for a portion of the container 410 to transition from the holder 440, towards the second end 444 of the holder 440, and through the ejection opening 446 of the holder 440.

While an exemplary embodiment, such as the embodiment illustrated in FIG. 2, illustrates feeding mechanism 460 that includes the first and second feeders 460A, 460B, any suitable number of feeders may be included in a feeding mechanism for a chaff dispensing system. Examples of suitable numbers of feeders that may be included in a feeding mechanism for a chaff dispensing system include at least one, a plurality; two, three, four, five; six; or any other suitable number of feeders in a feeding mechanism for a chaff dispensing system.

In addition, the feeder mechanism 460 is electrically connected to the controller 480 such that the controller 480 controls the operation of the feeder mechanism 460 during wartime of the chaff dispensing system 400. In the illustrated embodiment, the feeder mechanism 460 includes an ON state and an OFF state that is controlled by the controller 480 through the on-board EW system or CMDS located in the aircraft 10. In the OFF state, the feeder mechanism 460 remains stationary to prevent the container 410 to progress through feeding mechanism 460. In the ON state, the feeder mechanism 460 provides the capability of exerting a force against the container 410 to move the container 410 from the holder 440 and through the feeder mechanism 460. Once the volume of chaff material 490 is determined suitable by the controller 480, the feeder mechanism 460 is enabled to the OFF state, via the controller 480, to prevent the container 410 from progressing through the feeder mechanism 460.

In the illustrated embodiment, the dispensing assembly 430 includes a set of guide rails 468. The set of guide rails 468 are disposed adjacent to the second end 464 of the feeding mechanism 460. The set of guide rails 468 are disposed between the feeding mechanism 430 and the crushing mechanism 470 in the chaff dispensing system 400. In the illustrated embodiment, the set of guide rails 468 guide and/or lead a portion of the container 410 to the crushing mechanism 470, which is described in more detail below. In addition, the guide rails 468 are used similarly in both the chaff dispensing system 400 or the alternative dispensing system 400' to eject the container 410, 410'.

The crushing mechanism 470 includes a first end 472 and a second end 474 that directly opposes the first end 472 and defines an ejection nozzle 478. The first end 472 of the crushing mechanism 470 is disposed adjacent to the set of guide rails 468. The second end 474 of the crushing mechanism 470 is disposed adjacent to the exterior environment of the chaff dispensing system 400 and near the rear end of the aircraft 10. The crushing mechanism 470 directly contacts and interfaces with the container 410 at the second end 414 of the container 410 once a portion of the container 410 is being fed through the feeding mechanism 460. In addition, the crushing mechanism 470 is used similarly in both the chaff dispensing system 400 or the alternative dispensing system 400' to eject the container 410, 410'.

In one exemplary embodiment, such as the embodiments in FIGS. 5A and 53, the crushing mechanism 470 may include a first crusher 470A and a second crusher 470B that are disposed parallel to each other, but directly oppose each other. Each of the first crusher 470A and the second crusher 4703 exerts a force against the container 410 that is directed from first end 472 of the crushing mechanism 470 towards the second end 474 of the crushing mechanism 470 along the longitudinal axis 461 of the feeding mechanism 461. During operation, the first and second crushers 470A, 470B rotate in opposite directions while progressing from the second end 414 of the container 410 towards the first end 412 of the container 410. In the exemplary embodiment, the first crusher 470A rotates in a clockwise direction as illustrated by arrows 471, and the second crusher 470B rotates in the opposite, counter-clockwise direction relative to the first crusher 470A as illustrated by arrows 473. Such difference in rotation between the first and second crushers 470A, 470B allows for the first and second crushers 470A, 470B to equally assert a force along opposing sides of the container 410. The configuration between crusher mechanism 470 and the container 410 allows for the crusher mechanism 470 to simultaneously crush and dispense a metered volume of chaff material 490 through the ejection nozzle 478 that is disposed with the container 410, which is described in more detail below.

While an exemplary embodiment, such as the embodiment illustrated in FIG. 2, illustrates crushing mechanism 470 that includes the first and second crushers 470A, 470B, any suitable number of crushers may be included in a crushing mechanism for a chaff dispensing system. Examples of suitable numbers of crushers that may be included in a crushing mechanism for a chaff dispensing system include at least one, a plurality, two, three, four, five, six, or any other suitable number of crushers in a crusher mechanism for a chaff dispensing system.

In addition, the crushing mechanism 470 is electrically connected to the controller 480 such that the controller 480 controls the operation of the crushing mechanism 480 during wartime of the chaff dispensing system 400. In the illustrated embodiment, the crushing mechanism 470 includes an ON state and an OFF state that is controlled by the controller 470 through the on-board EW or CMDS system located in the aircraft 10. In the OFF state, the crushing mechanism 470 remains stationary to prevent any volume of chaff material 490 in the container 410 to progress through crushing mechanism 470 and eject into the surrounding environment of the chaff dispensing system 400. In the ON state, the crushing mechanism 470 provides the capability exerting a force against the container 410 to crush and dispense a metered volume of chaff material 490 from the container 410 into the surrounding environment of the chaff dispensing system 400 and the aircraft 10. Once the metered volume of containers in the container 410 is determined suitable by the controller 480, the crushing mechanism 470 is enabled to the OFF state, via the controller 480, to prevent any volume of chaff material 490 from being ejected from the container 410 and to progress through the crushing mechanism 470.

Having now described the components in the chaff dispensing system 400, a method of use for the chaff dispensing system 400 is described in detail below.

Prior to installing the plurality of container 410 onto a pylon of the plurality of pylons 12 of the aircraft 10, the container 410 is filled with a volume of chaff material 490. The volume of chaff material 490 included in the container 410 may be of any suitable volume for a particular embodiment of the chaff dispensing system 400, including the type of mission that will be performed by the aircraft 10. Once the container 410 is filled with the volume of chaff material 490 and is sealed, the container 410 may be loaded on the aircraft 10 at a location that includes the dispensing assembly 430 (e.g. onto a pylon of the plurality of pylons 12, underneath a wing of the aircraft, on a fuselage mounting point, etc.). Once the container 410 is provided on the aircraft 10 and is in communication with the dispensing assembly 430, the chaff dispensing system 400 is ready for operation during flight and wartime of the aircraft 10.

During flight and wartime of the aircraft 10, the on-board EW system of the aircraft 10 may initiate the chaff dispensing system 400, either manually or autonomously. Such initiation of the chaff dispensing system 400 by the on-board EW system is operated through the controller 480 to dispense and eject a metered volume of chaff material 490 from the container 410 in the chaff dispensing system 300. Upon initiation, the controller 480 sends a first signal to the feeding mechanism 460 to enable to the feeding mechanism 460 to an ON state. In the ON state, the feeding mechanism 460 exerts a first pulling force at the second end 414 of the container 410 to move the container 410 from the holder 440, over the second lateral wall 444A, and through the ejection opening 446. The first signal sent by the controller 480 may be continuously relayed to the feeding mechanism 460 to continuously exert the first pulling force against container 410. Such continual exertion of pulling force on the container 410 provides immediate access of chaff material 490 for the crushing mechanism 470.

As the container 410 moves through the feeding mechanism 460 and the set of guide rails 468, the controller 480 sends a second signal to the crushing mechanism 470 to enable the crushing mechanism 470 to an ON state. In the ON state, the crushing mechanism 470 allows for the rotation of the first and second crushers 470A, 4703 to directly interface and contact the container 410. The crushing mechanism 470 crushes and ejects the volume of chaff material 490 from the container 410 through the ejection nozzle 478 and behind, or to the side of, the aircraft 10. Such ejection behind the aircraft 10 and/or to the side of the aircraft 10 is used to divert any incoming enemy threats.

As the volume of chaff material 490 in the container 410 moves through crushing mechanism 470, the volume of chaff material 490 is metered by the on-board EW system through the controller 480. As the metered volume of chaff material 490 has been ejected, the controller 480 will then send a third signal to the feeding mechanism 460 and a fourth signal to the crushing mechanism 470 to enable each of the feeding mechanism 460 and the crushing mechanism 470 to an OFF state. Such metering of the chaff material 490 is determined by the on-board EW system on the aircraft 10, through the use of the controller 480, where the metering of the volume of chaff material 490 is based upon certain variables and/or parameters the aircraft 10 is experiencing during wartime (e.g., deterring and diverting an incoming threat).

Furthermore, the ON and OFF states of each of the feeding mechanism 460 and crushing mechanism 470 that is enabled by the controller 480 may be repeated until the container 410 no longer comprises of a volume of chaff material 490. As such, the controller 480 may send signals to the feeding mechanism 460 and crushing mechanism 470 to eject different metered volumes of chaff material 490 upon the parameters the aircraft 10 is experiencing during wartime. For example, first and second metered volumes of chaff material 490 may be ejected and dispensed from the chaff dispensing system 400 at different times based on the determination from the on-board EW system. In this example, the first and second metered volumes of chaff material 490 may be equal or different in volumes based on the parameters determined by the on-board EW system (e.g., deterring and diverting an incoming threat).

While the dispensing assembly 430 includes certain components in the chaff dispensing system 400, such components may be omitted. In one exemplary embodiment, the feeding mechanism 460 may be omitted from the chaff dispensing system 400 to a provide a more compact design of the dispensing assembly 430. In this exemplary embodiment, the crushing mechanism 470 would include the pulling force of the feeding mechanism 460 upon the container 410. In another exemplary embodiment, the set of guide rails 468 may be omitted if the feeding mechanism 460 is omitted or to provide a more compact design for the dispensing assembly 430.

The chaff dispensing system 400 is considered advantageous at least because the chaff dispensing system 400 is able to variably, continuously, and discretely dispense and eject volumes of chaff material 490 based on warnings detected by the on-board EW or CMDS system. The dispensing assembly 430, via the feeding mechanism 460, is able to continuously, variably, or discretely exert a force onto the container 410 that is directed to the crushing mechanism 470 to provide the crushing mechanism 470 with an immediate volume of chaff material 490 provided in the container 410. The crushing mechanism 470 may also continuously, variably, or discretely eject a metered volume of chaff material 490 from the chaff dispensing system 400 based on the determinations made by the on-board EW system. In one exemplary embodiment, the crushing mechanism 470 may eject a first volume of chaff material at a first time based on an incoming threat detected by the on-board EW system and then a second volume of chaff material to at a second time based on the same or another incoming threat detected by the on-board EW system. Here, the first volume of chaff material may be greater, less than, or equal to the second volume of chaff material ejected by the chaff dispensing system 400.

FIGS. 6A and 6B illustrate another chaff dispensing system 500. The chaff dispensing system 500 is similar to the chaff dispensing system 100 as illustrated in FIG. 1, except as described below. The chaff dispensing system 500 includes a container 510, a dispensing assembly 530, a controller 580, and a volume of chaff material 590.

The container 510 includes an open first end 512, a second end 514 that directly opposes the first end 512, and a longitudinal axis 511 that extends from the first end 512 to the second end 514. The container 510 includes an inlet port 516 disposed at the open first end 512 of the container 510. The inlet port 516 is sized and configured to interface with the dispensing assembly 530, which is described in more detail below. The container 510 also includes an ejection nozzle 518 at the second end 514 of the container 510. The ejection nozzle 518 defines a first ejection opening 518A and a second ejection opening 518B. The first ejection opening 518A is disposed at a location between the first and second ends 512, 514 of the container 510 that is closer to the first end 512, and the second ejection opening 518B is disposed at the second end 514 of the container 510. The first ejection opening 518A defines a first diameter 519A, and the second ejection opening 519B defines a second diameter 519B. In the illustrated embodiment, the second diameter 519B is greater than the first diameter 519A. In addition, an ejection passageway 518C extends between the first and second ejection openings 518A, 518B in the ejection nozzle 518. Moreover, the container 510 also includes a chamber 520 that is defined by a circumferential wall 521. The chamber 520 extends from the inlet port 516 of the container 510 to the ejection port 518 of the container 510. The chamber 520 is sized and configured to receive and house the volume of chaff material 590. The chamber 520 also includes a third diameter 520A defined by the circumferential wall 521 that is continuous from the first end 512 to the first ejection opening 518A. The third diameter 520A is greater than the first and second diameters 519A, 519B of the first and second ejection openings 518A, 518B.

In addition, the container 510 includes a plunger 522 that is movably disposed within the chamber 520 of the container 510. The plunger 522 defines a first end 522A that diametrically opposes a second end 522B. The plunger 522 includes a recess 523 that is defined by a wall 524. The recess 523 extends from the first end 522A of the plunger 522 to a location between the first end 522A and the second end 522B of the plunger 522. A seal 526 is circumferentially disposed about the plunger 522 and defines a fourth diameter 526A. As illustrated in FIG. 6A, the fourth diameter 526A is substantially equal to the third diameter 520A of the chamber 520 defined by the circumferential wall 521 such that the plunger 522 and the seal 526 move within the chamber 520 of the container 510 but prevents a volume of chaff material 590 from passing over the seal 526 and towards the first end 512 of the container 510 during movement of the plunger 522 and seal 526. While FIGS. 6A and 6B illustrate a gap between the seal 526 and the container 510, the gap is only used for illustrative purposes to clearly illustrate the seal 526 being disposed within the 520 of the container 510. It will be understood that the gap illustrated in FIGS. 6A and 6B is used for clarity only and does not limit the configuration of the seal 526 and the container 510 in the presented embodiment.

Furthermore, a cap 528 is movably disposed on the container 510 and defines a fifth diameter 528A. In the illustrated embodiment, the fifth diameter 528A is greater than the second diameter 519B of the ejection nozzle 518 to allow the cap 528 to be disposed circumferentially about a portion of the ejection nozzle 518. As state above, the cap 528 is movably disposed on the container 510. Prior to operation of the chaff dispensing system 500, the cap 528 remains disposed on the ejection nozzle 518 of the container 510 to prevent any volume of chaff material 590 from ejecting or dispensing out of the container 510 prior to use. Once operation of the chaff dispensing system 500 begins, the cap 528 is removed from the ejection nozzle 518 via the force exerted on the volume of chaff material 590 that is caused by the dispensing assembly 530. In one exemplary embodiment, a fifth diameter may be less than a second diameter in which a cap may be disposed inside of an ejection nozzle at a second ejection opening to contain a volume of chaff material 490.

The dispensing assembly 530 includes a holder 540. As illustrated in Fla 6A and GB, the holder 540 includes a first end 542 that defines a first lateral wall 542A and an inlet opening 542B, a second end 544 that opposes the first end 542 and defines a second lateral wall 544A and an ejection slot 546, a base wall 548 that extends from the first lateral wall 542A to the second lateral wall 544A, and a central opening 550. The first lateral wall 542A directly faces the first end 512 of the container 510 upon the container 510 being loaded into the holder 540. The second lateral wall 544A directly interfaces with and contacts the ejection nozzle 518 and a portion of the container 510 near the second end 514 of the container 510. The ejection slot 546 is sized and configured to receive and house a portion of the ejection nozzle 518 such that a portion of the ejection nozzle 518 directly interfaces with the ejection slot 546 upon loading the container 510 into the holder 540. The central opening 550 is disposed directly opposite to the base wall 548 and disposed between the first and second lateral walls 542A, 544A. The inlet opening 550 allows a user to load a container 510 into the holder 540 prior to flight of the aircraft 10. Furthermore, the first lateral wall 542A, the second lateral wall 544A, and the base wall 548 collectively define a cavity that is sized and configured to receive and house the container 510 upon loading.

The dispensing assembly 530 includes a plunging piston 560. The plunging piston 560 defines a first end 562, a second end 564 this disposed directly opposite to the first end 562, a longitudinal axis 561 that extends between the first and second ends 562, 564 of the plunging piston 560, and a shaft 565 that extends between the first and second ends 562, 564 of the plunging piston. The plunging piston 560 includes a lead screw 566 that is disposed circumferentially about the shaft 565. The lead screw 566 is defined from the first end 562 of the plunging piston 560 and extends towards the second end 564 of the plunging piston 560 to a location between the first and second ends 562, 564. The lead screw 566 is sized and configured to directly contact a drive mechanism 570 of the dispensing assembly 530 in order to move the plunging piston 560 from a first position to a second position within the holder 540 and the container 510, which is described in more details below. In addition, the lead screw 566 is sized and configured to be moveably disposed within the inlet opening 542B of the holder 540 to allow the plunging piston 560 to move from a first position to a second position within the holder 540 and the container 510.

The plunging piston 560 also includes a head 568 that is disposed at the second end 564 of the plunging piston 560. The head 568 of the plunging piston 560 is sized and configured to be disposed within the recess 523 of the plunder 522 and directly contact the wall 524 of the plunger 522 during operation of the chaff dispensing system 500. Prior to the container 510 being loaded into the holder 540, the head 568 is disposed at the first end 542 of the holder 540 to allow the container 510 to be loaded in the cavity 552 of the holder 540. Once loaded, the head 568 may directly interface and contact the wall 524 of the plunder 522 and be disposed within the recess 523 of the plunger 522.

Furthermore, the dispensing assembly 530 includes a drive mechanism 570. The drive mechanism 570 is mechanically linked to a motor (not illustrated) that provides power to operate the drive mechanism 570 during operation of the chaff dispensing system 500. The drive mechanism 570 may be electrically connected to the power source located on the pylon of the plurality of pylons 12. In this illustrated embodiment, the drive mechanism 570 is configured to complement the lead screw 566 of the plunging piston 560 in order to transition the plunging piston 560 from a first position to a second position within the container 510 and the holder 540. The drive mechanism 570 rotates the plunging piston 560, as illustrated by arrow 563, to transition the plunging piston 560 from a first position to a second position. The transition of the plunging piston 560 provides a mechanism to eject a metered volume of chaff material 590 outside of the container 510. The plunging piston 560 may be of any electro-mechanical system that is capable of exhibiting controlled force/movement such as a pneumatic or hydraulic piston.

In the illustrated embodiment, the drive mechanism 570 has an ON state and an OFF state that is controlled by the controller 580 through the on-board EW or CMDS system located in the aircraft 10. In the OFF state, the drive mechanism 570 remains stationary to prevent any volume of chaff material 590 to progress through the chamber 520 of the container 510 and out the ejection nozzle 518. In the ON state, the drive mechanism 570 provides the capability of measuring and/or metering a measured volume of chaff material 590 eject from the container 510. Such metered volumes of chaff material 590 may vary and may be determined by the controller 580 during use of the chaff dispensing system 500. Once the metered volume of chaff material 590 is determined suitable by the controller 580, the drive mechanism 570 is activated to the OFF state, via the controller 580, to prevent any volume of chaff material 590 to progress through the chamber 520 of the container 510 and out the ejection nozzle 518.

Having now described the components in the chaff dispensing system 500, a method of use for the chaff dispensing system 500 is described in detail below.

Prior to installing the container 510 onto a pylon of the plurality of pylons 12 of the aircraft 10, the container 510 is filled with a volume of chaff material 590. The volume of chaff material 590 included in the container 510 may be of any suitable volume for a particular embodiment of the chaff dispensing system 500, including the type of mission that will be performed by the aircraft 10. Once the container 510 is filled with a volume of chaff material 590, the container 510 may be loaded on the aircraft 10 at a location that includes the dispensing assembly 530 (e.g. onto a pylon of the plurality of pylons 12, underneath a wing of the aircraft, on a fuselage mounting point, etc.). Upon loading, the head 568 of the plunging piston 560 may directly interface and contact the wall 524 of the plunger 522 such that a volume of chaff material 590 may be dispensed immediately upon operation of the chaff dispensing system 500. The initial interaction between the plunger 524 and the plunging piston 560 does not move or eject any volume of chaff material 590 from the container 510. Once the container 510 is provided on the aircraft 10 and is in communication with the dispensing assembly 530, the chaff dispensing system 500 is ready for operation during flight and wartime of the aircraft 10. Prior to wartime, the cap 528 may be manually removed from the container 510 instead of the cap 528 being forced off and/or opened by the volume of chaff material 590 being ejected.

During flight and wartime, the on-board EW or CMDS system of the aircraft 10 may initiate the chaff dispensing system 500, either manually or autonomously. Such imitation of the chaff dispensing system 500 by the on-board EW system is operated through the controller 580 to dispense and eject a metered volume of chaff material 590 from the chaff dispensing system 500. Upon enablement, the controller 580 sends a first signal to the drive mechanism 570 to enable the drive mechanism 570 to the ON state. In the ON state, drive mechanism 570 moves the plunging piston 560 from a first position to a second position such that the head 568 transitions from the first end 512 of the container 510 towards the second end 514 of the container 510 to eject a metered volume of chaff material 590 as illustrated in FIG. 6B. Such movement occurs when the drive mechanism 570 rotates the plunging piston 560, via the complementary configuration between the drive mechanism 570 and the lead screw 566 of the plunging piston 560, about the longitudinal axis 561 of the plunging piston 560 to transition the plunging piston 560 into the container 510. Upon transition, the head 568 exerts a first force at the first end 522A of the plunger 520 that is directed towards the second end 514 of the container 510. The force exerted against the plunger 522 transitions the plunger 522 from the first end 512 of the container 510 towards the second end 514 of the container 510. During this movement, plunger 522 moves the volume of chaff material 590 from the chamber 520 towards the ejection nozzle 518 to eject the volume of chaff material 590 from the chaff dispensing system 500. The first signal sent by the controller 580 may be continuously relayed to the drive mechanism 570 to continuously exert the first force against the volume of chaff material 590.

As the drive mechanism 570 transition the plunging piston 560 through the container 510 to eject the volume of chaff material 590 moves through the ejection nozzle 518 of the container 510, the volume of chaff material 590 is metered by the on-board EW system through the controller 580. As the metered volume of chaff material 590 has been ejected, the controller 580 will then send a second signal to the drive mechanism 570 to enable the drive mechanism 570 to the OFF state. Such metering of the chaff material 490 is determined by the on-board EW system on the aircraft 10, through the use of the controller 480, where the metering of the chaff material 490 is based upon certain variables and/or parameters the aircraft 10 is experiencing during wartime (e.g., deterring and diverting an incoming threat).

Furthermore, the ON and OFF state of each of the drive mechanism 570 that is enabled by the controller 580 may be repeated until the container 580 is empty and no longer contains a volume of chaff material 590. As such, the controller 580 may send signals to the drive mechanism 570 to eject and propel different metered volumes of chaff material 590 upon the parameters the aircraft 10 is experiencing during wartime. In one exemplary embodiment, first and second metered volumes of chaff material 590 may be ejected and dispensed from the chaff dispensing system 500 at different times based on the determination from the on-board EW or CMDS system. In this exemplary embodiment, the first and second volumes volumes of chaff material 590 may be of equal volumes based on the parameters determined by the on-board EW system (e.g., deterring and diverting an incoming threat). In another exemplary embodiment, the first and second volumes volumes of chaff material 590 may be of different volumes based on the parameters determined by the on-board EW or CMDS system.

The chaff dispensing system 500 is considered advantageous at least because the chaff dispensing system 500 is able to variably, continuously, and discretely dispense and eject volumes of chaff material 590 based on warnings detected by the on-board EW or CMDS system. The dispensing assembly 530, via the plunging piston 560 and drive mechanism 570, is able to continuously, variably, or discretely exert a force onto the volume of chaff material 590. As such, the plunging piston 560 and drive mechanism 570 may continuously, variably, or discretely eject a metered volume of chaff material 590 from the chaff dispensing system 500 based on the determinations made by the on-board EW system. In one exemplary embodiment, the plunging piston 560 and drive mechanism 570 may eject a first volume of chaff material at a first time based on an incoming threat detected by the on-board EW or CMDS system and then a second volume of chaff material at a second time based on the same or another incoming threat detected by the on-board EW or CMDS system. Here, the first volume of chaff material may be greater, less than, or equal to the second volume of chaff material ejected by the chaff dispensing system 500.

FIG. 7A illustrates another chaff dispensing system 600. The chaff dispensing system 600 is similar to the chaff dispensing system 200 as illustrated in FIGS. 3A and 3B, except as described below. The chaff dispensing system 600 includes a container 610, a dispensing assembly 630 that include a pressure source 631 and an agitator 640, a controller 680, and a volume of chaff material 690.

The container 610 includes a first end 612, a second end 614 that directly opposes the first end 612, and a longitudinal axis 611 that extends from the first end 612 to the second end 614. The container 610 includes an inlet port 616 disposed at a location between the first and second ends 612, 614 of the container 610 that is closer to the first end 612. The container 610 also includes an ejection nozzle 618 at the second end 614 of the container 610. The ejection nozzle 618 defines a first ejection opening 618A and a second ejection opening 618B. The first ejection opening 618A is disposed at a location between the first and second ends 612, 614 of the container 610 that is closer to the first end 612, and the second ejection opening 6183 is disposed at the second end 614 of the container 610. The first ejection opening 618A defines a first diameter 619A, and the second ejection opening 618E defines a second diameter 619B. In the illustrated embodiment, the second diameter 619B is greater than the first diameter 619A. In addition, an ejection passageway 618C extends between the first and second ejection openings 618A, 618B in the ejection nozzle 618. Moreover, the container 610 also includes a chamber 620 that is defined by a circumferential wall 621. The chamber 620 extends from the inlet port 616 of the container 610 to the ejection nozzle 618 of the container 610. The chamber 620 is sized and configured to receive and house the volume of chaff material 690. The chamber 620 also includes a third diameter 620A defined by the circumferential wall 621 that is continuous from the first end 612 to the first ejection opening 618A. The third diameter 620A is greater than the first and second diameters 619A, 619B of the first and second ejection openings 618A, 618B to help direct and eject the volume of chaff material 690.

The chaff material 690 may be loaded into the chamber 620 of the container 610 in any suitable method of technique. In one exemplary embodiment, the chaff material 690 may be loaded into the chamber 620 of the container 610 through the inlet port 616 of the container 610 prior to the connection between the container 610 and the dispensing assembly 630. In another exemplary embodiment, the chaff material 690 may be loaded into the chamber 620 of the container 610 through the ejection portion 618 of the container 610 prior to the connection between the container 610 and the dispensing assembly 630. In yet another exemplary embodiment, the chaff material 690 may be loaded into the chamber 620 of the container 610 through a port or opening disposed at a location between the inlet port 616 or the ejection nozzle 618 prior to connection of the container 610 with the dispensing assembly 630.

The dispensing assembly 630 includes a pressure source 631 that is connected to the inlet port 616 of the container 610. The configuration of the connection between external pressure source 631 and the container 610 provides a first pressure against the volume of chaff material 690. Such force exerted by the pressure source 631 transitions the chaff material 690 from the chamber 620 of the container 610, towards the second end 614 of the container 610, and through the ejection nozzle 618 of the container 610 to transition the chaff material 690 outside of the container 610. The pressure source 631 may be configured and arrangement in any suitable way in the dispensing assembly 630. In one exemplary embodiment, a pressure source may be external to a dispensing assembly such that the pressure source is disposed exterior to a pod or payload that is housing a chaff dispensing system. In another exemplary embodiment, a pressure source may be internal to a dispensing assembly such that the pressure source is disposed inside a pod or payload that is housing a chaff dispensing system.

The pressure source 631 in the dispensing assembly 630 may be of any suitable device or apparatus that is able to exert a first pressure against the chaff material 690 to transition the chaff material 690 outside of the chamber 620 of the container 610. FIG. 7A illustrates an exemplary embodiment where the first pressure exerted on the volume of chaff material 690 generated by the pressure source 631 may be an air compressor 632 similar to the air compressor 232' illustrated in the chaff dispensing system 200'. The air compressor 623 includes a pneumatic actuator 632A that exerts a first pressure into the container 610 via a tube and/or pipe 632B. The first pressure exerted by the air compressor 632 against the volume of chaff material 390 moves the volume of chaff material 390 from the container 310 such that a metered volume of chaff material may be ejected. In addition, any suitable pressure source described and illustrated herein may be used for the pressure source 331, such as pressure source 231' of the chaff dispensing system 200' illustrated in FIG. 3B.

In addition, the pressure source 631 is electrically connected the controller 680 such that the controller 680 initiates and controls the operation of the pressure source 631 during wartime. In the illustrated embodiment, the pressure source 631 includes an ON state and an OFF state that is controlled by the controller 680 through an on-board EW or CMDS system located in the aircraft 10. In the OFF state, the pressure source 631 does not exert any pressure or force to prevent any volume of chaff material 690 that may progress through the chamber 620 of the container 610 and out the ejection nozzle 618. In the ON state, the pressure source 631 provides the capability exerting a force against the volume of chaff material 690 within the chamber 620 of the container 610 to move the volume of chaff material 690 towards the ejection nozzle 618. Once a metered volume of chaff material 690 has been ejected, the pressure source 631 is enabled to the OFF state, via the controller 680, to prevent any volume of chaff material 690 to progress through ejection nozzle 618 of the container 620.

In the illustrated embodiment, the regulating valve 636 is disposed along the ejection nozzle 618 between the first ejection opening 618A and the second ejection opening 618B. The regulating valve 636 controls the flow of the volume of chaff material 690 through the passageway 618C of the ejection nozzle 618. The regulating valve 636 is electrically connected to the controller 680 in the chaff dispensing system 600. In this illustrated embodiment, the regulating valve 636 has an open state and a closed state that is controlled by the controller 680 through an on-board EW or CMDS system located in the aircraft 10. In the closed state, the regulating valve 636 prevents any volume of chaff material 690 to progress through the ejection nozzle 618 towards the second ejection opening 618B. In the open state, the regulating valve 636 provides the capability of measuring and/or metering a measured volume of chaff material 690 to eject from the chaff dispensing system 600. Such metered volumes of chaff material 690 may vary and may be determined by the controller 680 during use of the chaff dispensing system 600. Once the metered volume of chaff material 690 is determined suitable by the controller 680, the regulating valve 636 is in the closed stated to prevent any volume of chaff material 690 to progress through the ejection nozzle 618 towards the second ejection opening 618B.

The agitator 640 includes a motor 642, a drive shaft 644 that defines a first end that operably engages the motor 642 and a second opposing end, and a plurality of blades 646 disposed radially on the second end 644B of the drive shaft 644. The engagement between the drive shaft 644 and the motor 642 allows the motor 642 to rotate the drive shaft 644 and the plurality of blades 646 about an axis that is perpendicular to the longitudinal axis 611 of the container 610, which is illustrated by arrows 645. Such rotation of plurality of blades 646 via the motor 642 agitates and/or mixes the volume of chaff material 690 within the chamber 620 of the container 610. In other exemplary embodiments, the agitator 640 may be of any suitable device capable of imparting energy into the volume of chaff material 690 to facilitate movement prior to ejection of the volume of chaff material 690. In one exemplary embodiment, an agitator may be a vibration device, such as a piezo-electric item or a vibration motor (unbalanced load), to move a volume of chaff material prior to ejection of the volume of chaff material. If a vibration device is used in this particular embodiment, the vibration device may be mounted to surface of a container to move the volume of chaff material. While the agitator 640 is provided in the chaff dispensing system 600, the agitator 640 may be inactive during wartime or may be omitted from the chaff dispensing system 600 depending upon the chaff material.

In the illustrated embodiment, the agitator 640 is disposed along a portion of the container 610 and inside of the chamber 620 of the container 610. As illustrated in FIG. 7A, the plurality of blades 646 and a portion of the drive shaft 644 are disposed inside of the chamber 620 of the container 610. The motor 642 and a portion of the drive shaft 644 are disposed outside the chamber 620 of the container 610. Such configuration between the container 610 and the agitator 640 allows the agitator 640 to agitate and/or mix the volume of chaff material 690 during the operation of the chaff dispensing system 600. The agitation and/or mixing caused by the agitator 640 provides additional force when ejecting the volume of chaff material 690 from the chamber 620 of the container 610. In addition, any suitable attachment and configuration between the container 610 and the agitator 640 may be used in the chaff dispensing system 600. In one exemplary embodiment, an agitator may be integral with a container such that agitator and the container is one unitary component. In another exemplary embodiment, an agitator may be a separate component from a container in which the agitator is disposed within a chamber of the container once the container interfaces with a dispensing assembly. In yet another exemplary embodiment, a plurality of blades and a drive shaft of an agitator may be disposed inside a container and connect to a motor of the agitator once the container interfaces with a dispensing assembly.

In addition, agitator 640 is electrically connected to the controller 680 such that the controller 680 controls the operation of the agitator 640 during wartime. In the illustrated embodiment, the agitator 640 includes an ON state and an OFF state that is controlled by the controller 680 through an on-board EW or CMDS system located in the aircraft 10. In the OFF state, the agitator 640 does not agitate any volume of chaff material 690 inside the chamber 620 of the container 610 due to the motor 642 not exerting any rotational force on the drive shaft 644. In the ON state, the agitator 640 exerts a force against the volume of chaff material 690 within the chamber 620 of the container 610 to agitate and/or mix the volume of chaff material 690 via the motor 642 rotating the plurality of blades 646 within the chamber 620. Once a metered volume of chaff material 690 has been ejected by the controller 680 through the use of a regulating valve 636, the agitator 640 is enabled to the OFF state, via the controller 680, to prevent any volume of chaff material 690 to progress through ejection nozzle 618 of the container 620.

Having now described the components in the chaff dispensing system 600, a method of use for the chaff dispensing system 600 is described in detail below.

Prior to installing the container 610 onto a pylon of the plurality of pylons 12 of the aircraft 10, the container 610 is filled with a volume of chaff material 690. The volume of chaff material 690 included in the container 610 may be of any suitable volume for a particular embodiment of the chaff dispensing system 600, including the type of mission that will be performed by the aircraft 10. Once the container 610 is filled with a volume of chaff material 690, the container 610 may be loaded on the aircraft 10 at a location that includes the dispensing assembly 630 (e.g. onto a pylon of the plurality of pylons 12, underneath a wing of the aircraft, on a fuselage mounting point, etc.). Upon loading, the pressure source 631 is attached to the inlet port 616 of the container 610 such that the pressure source 631 is in fluid communication with the container 610. Once the container 610 is provided on the aircraft 10 and is in communication with the dispensing assembly 630, the chaff dispensing system 600 is ready for operation during flight and wartime of the aircraft 10.

During flight and wartime, the on-board EW or CMOS system of the aircraft 10 may initiate the chaff dispensing system 600, either manually or autonomously. Such initiation of the chaff dispensing system 600 by the on-board EW or CMDS system is operated through the controller 680 to dispense and eject a metered volume of chaff material 690 from the chaff dispensing system 600. Upon initiation, the controller 680 sends a first signal to the pressure source 631 to enable the pressure source 631 to an ON state. In the ON state, the pressure source 631 exerts a first pressure force at the inlet port 616 of the container 610 to move the volume of chaff material 690 from chamber 620 towards the ejection port 618. The first signal sent by the controller 680 may be continuously relayed to the pressure source 631 to continuously exert the first pressure force against the volume of chaff material 690. Such continual exertion of pressure on the volume of chaff material 690 provides immediate access of chaff material 690.

As the pressure source 631 is in the ON state, the controller 680 sends a second signal to the agitator 640 to enable to the agitator 640 to the ON state. The second signal sent by the controller 680 to the agitator 640 may be performed after the first signal or nearly simultaneously with the first signal. In the ON state, the agitator 640 agitates the volume of chaff material 690 via the plurality of blades 646. The first signal sent by the controller 680 may be continuously relayed to the agitator 640 to continuously agitate the volume of chaff material 690 prior to or during ejection of the volume of chaff material 690. Such continual agitation on the volume of chaff material 690 assists the pressure source 631 when exerted a force onto the volume of chaff material 690 to eject the volume of chaff material 690 and provides an ample mixing of the volume of chaff material 690.

As the volume of chaff material 690 transitions toward the ejection nozzle 618 and abuts the regulating valve 636, the volume of chaff material 690 is maintained in the ejection passageway 618C due to the regulating valve 636 being defined in its closed state. The closed state of the regulating valve 636 is controlled by the controller 680 due to the regulating valve 636 being operably connected to the controller 686. Once the on-board EW system determines that ejection of chaff material is necessary, the controller 680 will send a third signal to the regulating valve 636 to enable the regulating valve to an open state. Such open state of the regulating valve 636 allows for the volume of chaff material 690 to pass through the regulating value 636 and eject from the ejection nozzle 618 and behind, or to the side of, the aircraft 10. During this state, the regulating valve 636 maintains the open state through the controller 680 in which a metered volume of chaff material 690 is dispensed into the exterior environment. Once a suitable volume of metered chaff material 690 has been dispensed into the exterior environment, the controller 680 sends another signal to the regulating valve 636 to enable the regulating valve to the closed state. Such metering of the chaff material 690 is determined by the on-board EW or CMDS system on the aircraft 10, through the use of the controller 680, where the metering of the chaff material 690 is based upon certain variables and/or parameters the aircraft 10 is experiencing during wartime (e.g., deterring an incoming threat).

Furthermore, the ON and OFF states of each of the pressure source 631 and the agitator 640 and the open and closed states of the regulating valve 636 enabled by the controller 680 may be repeated until the container 610 is empty and no longer contains a volume of chaff material 690. As such, the controller 680 may send signals to the pressure source 631, the agitator 640, and the regulating valve 636 to eject and propel different metered volumes of chaff material 690 based on the parameters the aircraft 10 is experiencing during wartime. For example, first and second metered volumes of chaff material 690 may be ejected and dispensed from the chaff dispensing system 600 at different times based on the determination from the on-board EW or CMDS system. In this example, the first and second metered volumes of chaff material 690 may be equal or different in volumes based on the parameters determined by the on-board EW or CMDS system (e.g., deterring and diverting an incoming threat).

The chaff dispensing system 600 is considered advantageous at least because the chaff dispensing system 600 is able to variably, continuously, and discretely dispense and eject volumes of chaff material 690 based on warnings detected by the on-board EW or CMDS system. The dispensing assembly 630, via the pressure source 631, is able to continuously or variably exert a force onto the volume of chaff material 690 directed to the regulating valve 636 to provide the regulating valve 636 with an immediate volume of chaff material 690. Additionally, the regulating valve 636 may continuously, variably, or discretely eject a metered volume of chaff material 690 from the chaff dispensing system 600 based on the determinations made by the on-board EW or CMDS system. In one exemplary embodiment, the regulating valve 636 may eject a first volume of chaff material at a first time based on an incoming threat detected by the on-board EW or CMDS system and then a second volume of chaff material at a second time based on the same or another incoming threat detected by the on-board EW or CMDS system. Here, the first volume of chaff material may be greater, less than, or equal to the second volume of chaff material ejected by the chaff dispensing system 600.

FIG. 7B illustrates an alternative chaff dispensing system 600'. The chaff dispensing system 600' is similar to the chaff dispensing system 600 illustrated in FIG. 6A, except as described below.

In the chaff dispensing system 600', the container 610' is internally pressurized via an inert gas composition. Such inert gas composition may be used to pressurize to the container 610' that will not negatively interact with the volume of chaff material 690. The container 600' is pressurized at a pressure volume substantially different from the ambient pressure. As such, the chaff dispensing system 600' omits a pressure source, such as external pressure source 631, due to the internal pressurization of the container 610'. Moreover, the chaff dispensing system 600' omits an agitator, such as agitator 640, due to the internal pressurization of the container 610'. Furthermore, the operation of ejecting a metered volume of chaff material 690 via a regulating valve 636' from the container 610' is similar to the operation of ejecting a metered volume of chaff material 490 via a regulating valve 636 from the container 610 by omitting the pressure source and the agitator.

Figure 8:
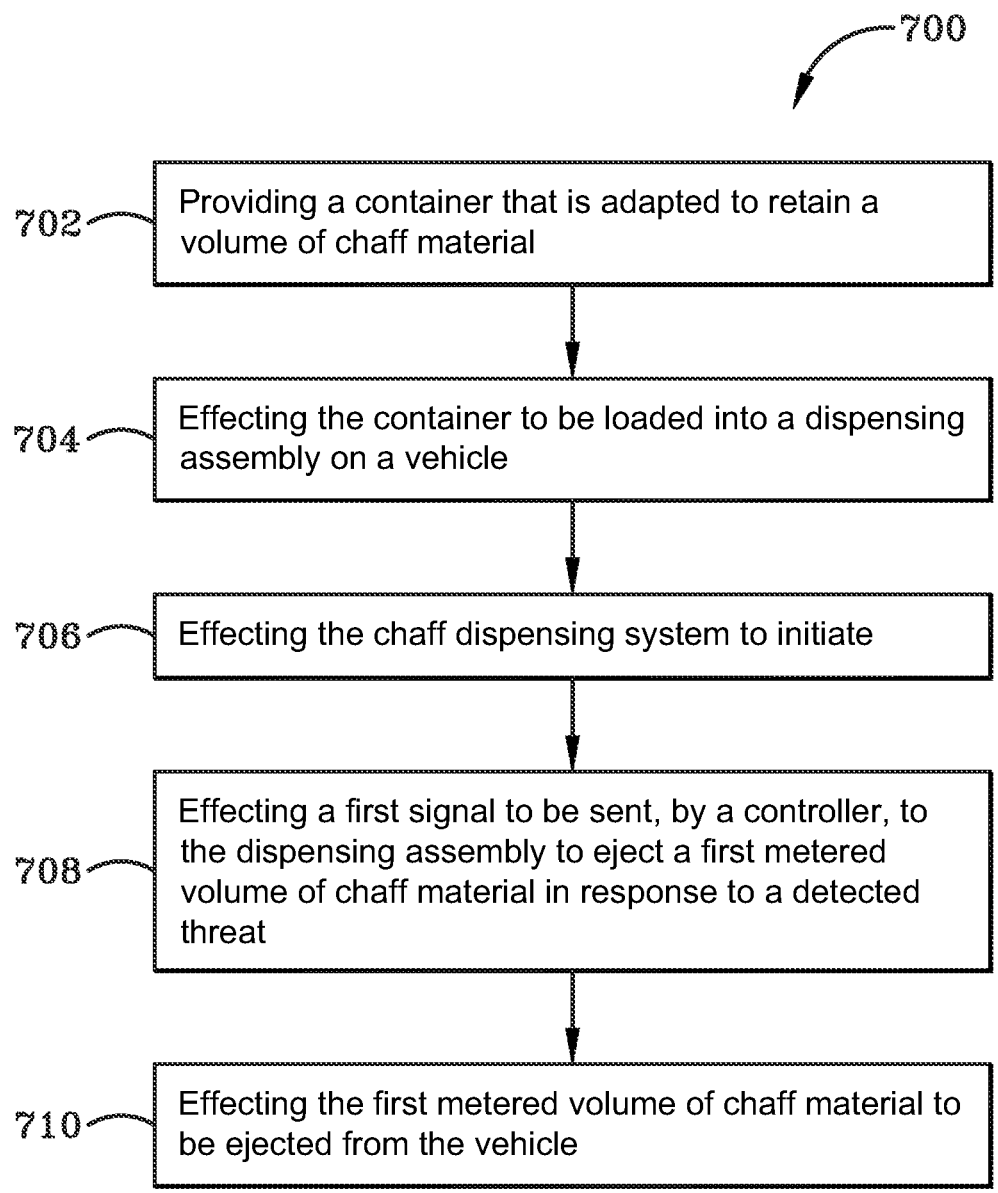
FIG. 8 is an exemplary method flow chart for ejecting a metered volume of chaff material from a chaff dispensing system.

FIG. 8 illustrates a method 700 for ejecting metered volumes of chaff material from a chaff dispensing system on an aircraft. The initial step 702 comprises of providing a container that is adapted to retain a volume of chaff material. Another step 704 comprises of effecting the container to be loaded into a dispensing assembly on a vehicle. Another step 706 comprises of effecting the chaff dispensing system to initiate. Another step 708 comprises of effecting a first signal to be sent, by a controller, to the dispensing assembly to eject a first metered volume of chaff material in response to a detected threat. Another step 710 of effecting the first metered volume of chaff material to be ejected from the vehicle.

In an exemplary embodiment, method 700 may include additional steps for ejecting metered volumes of chaff material from a chaff dispensing system on an aircraft. An optional step may comprise of sending a second signal, via the controller, the dispensing assembly to eject a second metered volume of chaff material, wherein the second metered volume of chaff material is different than the first metered volume of chaff material. Another optional step may comprise of metering a volume of chaff material by a regulating valve; this optional step may occur after Step 710 or be repeated depending on the metered volume of chaff material that is ejected by the chaff dispensing system. Another optional step may comprise of sending a third signal, via the controller, to the dispensing assembly to eject a second metered volume of chaff material wherein the second metered volume of chaff material is different than the first metered volume of chaff material; this optional step 718 may occur after step 710, Another optional step comprises of sending a fourth signal, via the controller, to the regulating valve to eject the second metered volume of chaff material wherein the second metered volume of chaff material is different than the first metered volume of chaff material. Another optional step may comprise of opening the seal of the container; this step may occur prior to step 704.

While a single chaff dispensing system, such as chaff dispensing system 100, is mounted to a pylon in the plurality of pylons 12, any suitable number of chaff dispensing systems can be mounted to a plurality of pylons that is available on an aircraft. In one exemplary embodiment, an aircraft, such as aircraft 10, may include a single chaff dispensing system on a pylon of the plurality of pylons 12. In another exemplary embodiment, an aircraft, such as aircraft 10, may carry any suitable number of chaff dispensing system on a plurality of pylons. Examples of suitable numbers of chaff dispensing system carried by an aircraft on a plurality of pylons include one, at least one, a plurality, two, three, four, five, six, or any other suitable number of chaff dispensing system carried by an aircraft on a plurality of pylons. In yet another exemplary embodiment, an aircraft, such as aircraft 10, may carry a chaff dispensing system on each pylon of a plurality of pylons.

A chaff dispensing system, such as chaff dispensing system 100, may be disposed inside a pod or payload that is mounted to a pylon in the plurality of pylons 12 In one exemplary embodiment, the container and the dispensing assembly may be separate components in a chaff dispensing system when disposed in a pod and/or payload. In another exemplary embodiment, the container and the dispensing assembly may be configured into a single, unitary pod and/or payload such that the single, unitary pod and/or payload is mount to a pylon of a plurality of pylons on an aircraft. In another exemplary embodiment, the container may be loaded into the dispensing assembly prior to wartime such that the dispensing assembly is mounted to a pylon of a plurality of pylons on an aircraft prior to the loading of the container. In another exemplary embodiment, the container and the dispensing assembly may be loaded into a wing of an aircraft in which the wing of the aircraft is adapted to receive the container and dispensing assembly. In another exemplary embodiment the container and the dispensing assembly may be loaded into a fuselage of an aircraft in which the fuselage of the aircraft is adapted to receive the container and dispensing assembly. Furthermore, the container and/or the dispensing assembly may be loaded into a separate component or structure that is operably engaged to the aircraft (e.g., a towable device).

While the chaff dispensing system 16 illustrated in FIG. 1 is mounted and carried by the plurality of pylons 12 of the aircraft 10, any suitable chaff dispensing system may be mounted and carried by a plurality of pylons on an aircraft. Examples of suitable chaff dispensing systems that may be mounted and carried by a plurality of pylons on an aircraft include chaff dispensing system 100, chaff dispensing system 200, chaff dispensing system 300, chaff dispensing system 400, chaff dispensing system 500, chaff dispensing system 600, chaff dispensing system 600', and any other suitable configurations or arrangements described and illustrated herein. In addition, an aircraft, such as aircraft 10, may include at least one chaff dispensing system described and illustrated herein on a plurality of pylons disposed on the aircraft. In an exemplary embodiment, an aircraft may dispose a single type of chaff dispensing system, such as chaff dispensing system 100, on a single pylon on the plurality of pylons on the aircraft. In another exemplary embodiment, an aircraft may dispose a single type of chaff dispensing system, such as chaff dispensing system 100, on at least one pylon on the plurality of pylons on the aircraft. In another exemplary embodiment, an aircraft may dispose more than one type of chaff dispensing system, such as chaff dispensing systems 100, 200, on the plurality of pylons on the aircraft.

In addition, the components that move and/or transition a volume of chaff material in any of the chaff dispensing system described herein control the flow rate of the volume of chaff material. In one exemplary embodiment, the components that move and/or transition a volume of chaff material in a chaff dispensing system described herein may move and/or transition the volume of chaff material at a constant flow rate when ejecting the volume of chaff material. In another exemplary embodiment, the components that move and/or transition a volume of chaff material in a chaff dispensing system described herein may move and/or transition the volume of chaff material at a variable flow rate when ejecting the volume of chaff material. As such, the components that move and/or transition a volume of chaff material in a chaff dispensing system described herein may move and/or transition the volume of chaff material at a flow rate that ranges from about 1 percent to about 100 percent in a constant or variable state when the components are in the ON state and/or in the open position. In addition, the components that move and/or transition a volume of chaff material in a chaff dispensing system described herein may prevent movement and/or transition of the volume of chaff material at a flow rate of zero percent when the components are in the OFF state and/or in the closed position.

Furthermore, any pressure source and regulating valve described herein may be controlled in various ways where the pressure source is controlled from the OFF state to the ON state and where the regulating valve is controlled from the closed state to the open state. In one exemplary embodiment, each of the pressure source and the regulating valve is electrically controlled by a motor such that the motor controls the ON and OFF states of the pressure source and the open and closed states of the regulating valve. The motor used in this exemplary embodiment may be a servo motor, a stepper motor, or other suitable motors for controlling a pressure source and a regulating valve in a chaff dispensing system. In this exemplary embodiment, the motors controlling the pressure source and the regulating valve is electrically connected to a controller provided in a chaff dispensing system. In another exemplary embodiment, each of the pressure source and the regulating valve is pneumatically controlled for controlling the ON and OFF states of the pressure source and the open and closed states of the regulating valve. In this exemplary embodiment, an air compressor, a pneumatic actuator, ram air captured by the aircraft, or other pneumatic means may be used for pneumatically controlling the ON and OFF states of the pressure source and the open and closed states of the regulating valve. The air compressor, pneumatic actuator, or similar pneumatic device controlling the pressure source and the regulating valve is electrically connected to a controller provided in a chaff dispensing system. In another exemplary embodiment, each of the pressure source and the regulating valve is hydraulically controlled for controlling the ON and OFF states of the pressure source and the open and closed states of the regulating valve. In this exemplary embodiment, a hydraulic cylinder or other hydraulic device may be used for hydraulically controlling the ON and OFF states of the pressure source and the open and closed states of the regulating valve. The hydraulic cylinder or similar hydraulic device that is used for controlling the pressure source and the regulating valve is electrically connected to a controller provided in a chaff dispensing system Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described; it may be possible to distribute that single logic between multiple physical logics.

Furthermore; the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data; analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other dements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving" "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An apparatus comprising:
 a chaff dispensing system comprising:
  a container having a first end, a second end, and a chamber extending between the first and second ends, the second end defining an ejection port, wherein the container is adapted to retain a volume of chaff material, said chaff material comprising glass and metal dipoles;
  a pressure source, comprising a roller, exerting a first force into the chamber against the volume of chaff material to transition the volume of chaff material from the first end toward the ejection port, the pressure source operably connected to the controller for actuating the pressure source from an ON state to an OFF state;
  a dispensing assembly provided on a vehicle, the dispensing assembly operably engaging the container; and
  a controller electrically connected to the pressure source and to the dispensing assembly;
  wherein the volume of chaff material is dispensed by the dispensing assembly in metered volumes of chaff material in response to instructions or signals from the controller.

2. The apparatus of claim 1, wherein a first volume of chaff material is metered at a first time and a second volume of chaff material is metered at a second time, the second volume of chaff material is different than the first volume of chaff material.

3. The apparatus of claim 1, wherein the pressure source is electrically controlled by a motor for ejecting the volume of chaff material.

4. The apparatus of claim 1, wherein the pressure source is adapted to supply a flow rate for ejecting the volume of chaff material.

5. The apparatus of claim 4, wherein the pressure source is adapted to supply a flow rate for ejecting the volume of chaff material that ranges from 1 percent up to 100 percent when the pressure source is in an ON state.

* * * * *